United States Patent [19]
Fujimaki et al.

[11] Patent Number: 4,898,799
[45] Date of Patent: Feb. 6, 1990

[54] PHOTORECEPTOR

[75] Inventors: Yoshihide Fujimaki, Hachioji; Shigeki Takenouchi, Chofu, both of Japan

[73] Assignee: Konica Corporation, Tokyo, Japan

[21] Appl. No.: 216,052

[22] Filed: Jul. 7, 1988

[30] Foreign Application Priority Data

Jul. 10, 1987 [JP] Japan .................................. 62-173640
Sep. 25, 1987 [JP] Japan .................................. 62-241983

[51] Int. Cl.$^4$ ........................... G03G 5/14; G03G 5/06
[52] U.S. Cl. ......................................... 430/59; 430/78; 540/141
[58] Field of Search ...................... 430/59, 78; 540/141

[56] References Cited

U.S. PATENT DOCUMENTS

| 4,444,861 | 4/1984 | Kogami et al. | 430/58 |
| 4,540,651 | 9/1985 | Fujimaki et al. | 430/59 X |
| 4,664,997 | 5/1987 | Suzuki et al. | 430/78 X |
| 4,701,396 | 10/1987 | Hung et al. | 540/141 X |
| 4,728,592 | 3/1988 | Ohaku et al. | 430/59 |
| 4,734,348 | 3/1988 | Suzuki et al. | 430/58 X |
| 4,777,251 | 10/1988 | Tanaka et al. | 540/141 X |

FOREIGN PATENT DOCUMENTS 62-272272  11/1987  Japan .................................. 430/78

Primary Examiner—Roland E. Martin
Attorney, Agent, or Firm—Finnegan, Henderson, Farabow, Garrett and Dunner

[57] ABSTRACT

A photoreceptor for electrophotography containing a titanyl phthalocyanine compound which has major peaks in terms of Bragg's $2\theta$ angle to the CuK$\alpha$ characteristic X-ray (wavelength at 1.541 Å) at least at 9.4±0.2 degrees, 11.7±0.2 degrees, 11.7±0.2 degrees, 15.0±0.2 degrees, 23.5±0.2 degrees, 24.1±0.2 degrees and 27.3±0.2 degrees is disclosed.

4 Claims, 7 Drawing Sheets

FIG. I

PHOTORECEPTOR

FIELD OF THE INVENTION

This invention relates to a photoreceptor for electrophotography and, specifically, one which is suitably used for printers, copying machines, etc., and which has high sensitivity to long wavelength light and semiconductor laser beam rather than to visible light.

BACKGROUND OF THE INVENTION

Electrophotographic photoreceptors having photosensitivity to visible light have been widely used for copying machines, printers, etc. As such electrophotographic photoreceptors, inorganic photoreceptors comprising, on an electroconductive support, with a photosensitive layer comprising selenium, zinc oxide, cadmium sulfide, and other inorganic photoconductive substances as the main ingredients have been widely used. However, these inorganic photoreceptors are not always satisfactory with respect to photosensitivity, thermal stability, waterproofness, durability and other characteristics required as electrophotographic photoreceptors for copying machines and others. For instance, selenium is inclined to be crystallized by heat or stained by such as fingerprints which easily deteriorate above characteristics. Electrophotographic photoreceptors using cadmium sulfide are inferior in waterproofness and durability and those using zinc oxide have a problem in durability. Electrophotographic photoreceptors using selenium and cadmium sulfide are also have disadvantageous restrictions in their manufacture and handling.

In order to improve such problems of inorganic photoconductive substances, various organic photoconductive substances have been experimentarily used for photosensitive layers of electrophotographic photoreceptors. Research and development in this field have actively evolved recently. For instance, an organic photoreceptor using a photosensitive layer containing poly-N-vinyl carbazole and 2, 4, 7-trinitrofluorenone is disclosed in Japanese Unexamined Patent Publication No. 50-10496. This photoreceptor is, however, not sufficient with respect to sensitivity and durability. Therefore, an electrophotographic photoreceptor of the separated function type with two layers, a photosensitive layer composing a carrier generating layer and a carrier transporting layer independently, which respectively contain a carrier generating substance and carrier transporting substance, were developed. This enables different substances to assume the carrier generating function and carrier transporting function independently. Therefore such substances that have one of the functions can be selected from wide range.

Thus, it is expected to obtain organic photoreceptors with high sensitivity and durability. Many carrier generating substances effective for the carrier generating layer of electrophotographic photoreceptors of the separate function type have been proposed. As an example of those using inorganic substances, amorphous selenium can be used as presented in the Gazette for the Japanese Unexamined Patent Publication No. 43-16198. This carrier generating layer containing the amorphous selenium is used in combination with a carrier transporting layer containing organic carrier transporting substance. However, the carrier generating layer comprising the amorphous selenium has the trouble of crystallization due to heat resulting in deterioration of the characteristics as described above. As an example using an organic substance as the carrier generating substance, there are organic dyes or pigments. For instances, those with a photosensitive layer containing bis-azo compounds represented in the Gazettes for Japanese Unexamined Patent Publication Nos. 47-37543, 55-22834, 54-79632, 56-116040, etc. have been already known.

However, though these bis-azo compounds represent relatively favorable sensitivity in the short and medium wavelength ranges, they are low in sensitivity in long wavelength range. It was difficult to use them in laser printers which use semiconductor laser beam sources and they require high reliability.

The gallium aluminum arsenide (Ga. Al. As) type light emitting element which is now widely used as semiconductor laser is more than 750 mm in oscillating wavelength. In order to obtain electrophotographic photoreceptors of high sensitivity for such long wave length light, many studies have been done. For instance, such a method was conceived as to add sensitizing agent to photosensitive materials such as Se, CdS and others with high sensitivity in the visible light range to make the wavelength longer. As described above, however, Se and CdS have not yet sufficient environmental resistance to temperature, humidity, etc. Also, a large number of organic type photoconductive materials have been known as described above; their sensitivity is limited to the visible light region below 700 nm usually and only a very small number of materials have enough sensitivity for longer wavelengths.

Among them phthalocyanine type compounds are known to have make photosensitivity than other especially in the long wavelength region. Among them, α-type titanyl phthalocyanine is presented in the Gazzette for the Japanese Unexamined Patent Publication No. 61-239248. This type titanyl phthalocyanine has the Bragg angle peaks when exposed to X-rays of CuKα 1.541Å at 7.5, 12.3, 16.3, 25.3, and 28.7. However, its sensitivity is low and electric potential stability is inferior in repeated use and is susceptible to photographic fog in electrophotographic processes using reversal development. Electrification power is also low and a sufficient image density is hard to obtain.

SUMMARY OF THE INVENTION

As described above, as an organic carrier generating substance with the sensitivity in the long wavelength range, a phthalocyanine compound is available. This is, however, a problem in the electric potential stability when manufactured or used as an electrophotographic photoreceptor repeatedly.

Therefore, the primary object of this invention is to provide a photoreceptor using titanyl phthalocyanine with high sensitivity especially to light of wavelength more than 600 nm.

Another object of this invention is to provide a photoreceptor with high electrical potential stability when used repeatedly.

Still another object of this invention is to provide a photoreceptor with high electrification power. Still another object of this invention is to provide a photoreceptor suitable for reversal process.

Other objects of this invention will become clear by the following description.

This invention relates to a photoreceptor containing a titanyl phthalocyanine with the major peaks of Bragg's $2\theta$ angle to the CuKα characteristic X-ray (wavelength 1.541Å) at least at 9.5 ±0.2 degrees, 9.7 ±0.2 degrees, 11.7 ±0.2 degrees, 15.0 ±0.2 degrees, 23.5 ±0.2 degrees, 24.1 ±0.2 degrees, and 27.3 ±0.2 degrees group.

BRIEF DESCRIPTION OF DRAWINGS

The drawings illustrate this invention, in which.

Numerals in drawings denote as follows.

1: Electric conductive support
2: 'Carrier generating layer
3: Carrier transport layer
4: 4′, 4″: photosensitive layer
5: Intermediate layer

DETAILED DESCRIPTION OF THE INVENTION

Figure 1:
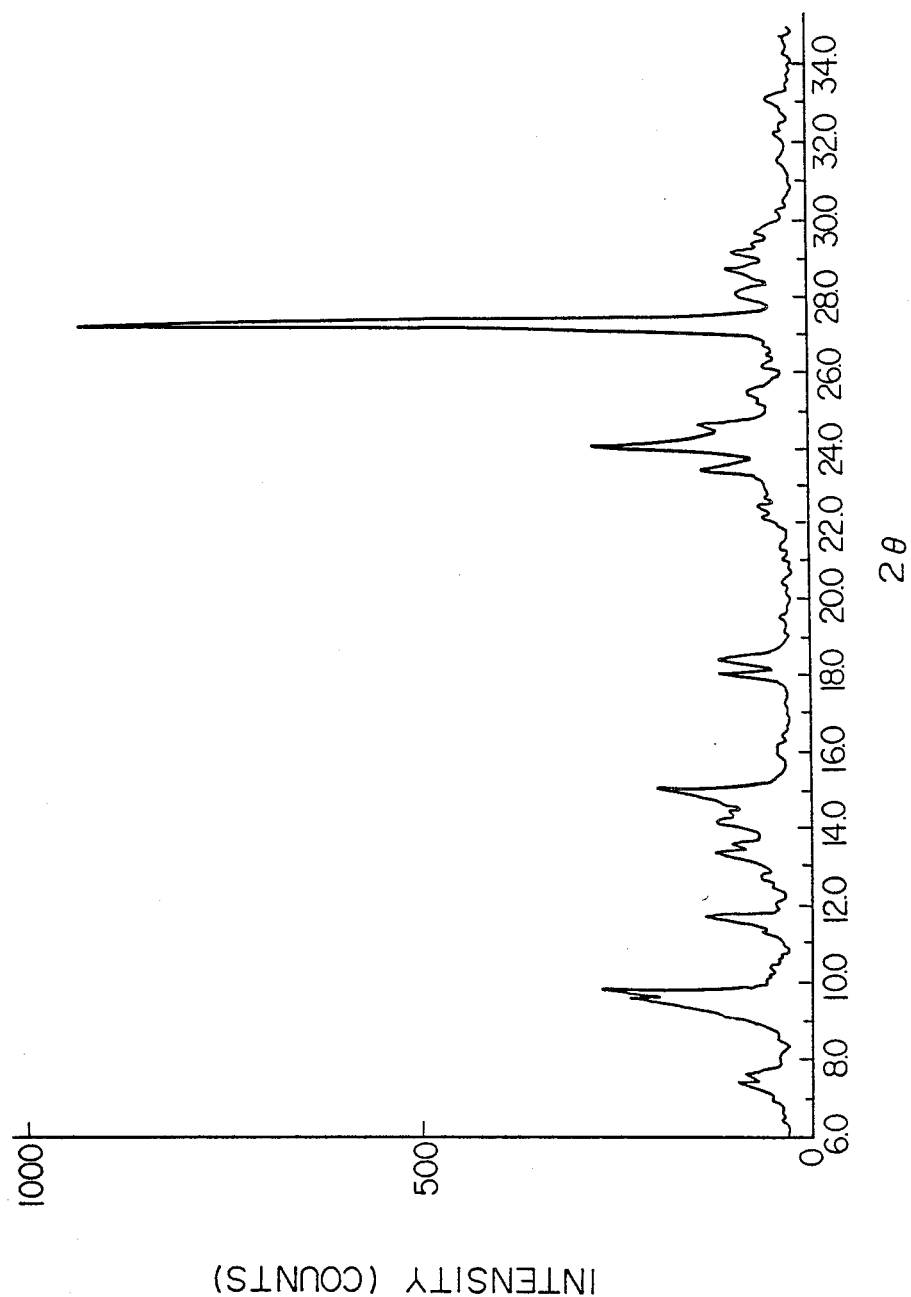
FIG. 1 shows X-ray diffraction of titanyl phthalocyanine.

Titanyl phthalocyanine according to this invention is used as a carrier generating substance when used as an electrophotographic photoreceptor of the separate function type. It composes a photoreceptor in combination with a carrier transporting substance. The titanyl phthalocyanine according to this invention is different one from the type titanyl phthalocyanine described above. It has X-ray diffraction spectrum with major peaks, sharply projecting from noises of the Bragg angle to the X-ray beam of CuKα1.541Å(error $2\theta\pm0.2$ degrees) at 9.5, 9.7, 11.7, 15.0, 23.5, 24.1, and 27.3 as shown in FIG. 1. Since the Bragg angle of the α-type titanium phthalocyanine to the X-ray beam of CuKα1.541Å is 7.5, 12.3, 16.3, 25.3, and 28.7 as described above, the titanium phthalocyanine according to this invention has a completely different crystal form as that of the type one.

Titanyl phthalocyamine according to this invention presents a special spectrum which has not been seen before as described above. Its basic constitution is expressed by the following general formula.

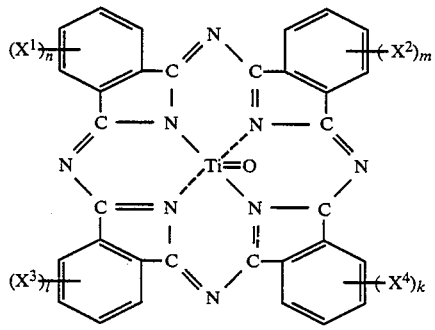

(where, $X^1$, $X^2$, $X^3$, and $X^4$ represent Cl or Br and n, m, l and k represent integers 0–4.)

The above X-ray diffraction spectra were measured under the conditions below (same hereafter).
X-ray tube bulb: Cu
Voltage: 40.0 KV
Current: 100.0 mA
Start angle: 6.00 deg.
Stop angle: 35.00 deg.
Step angle: 0.020 deg.
Measuring time: 0.50 sec.

The production method of titanyl phthalocyanine according to this invention is described below with examples. For instance, titanium tetrachloride and phthalodinitrile are mixed in α-chloronaphthalene solvent. The resulting dichloro titanium phthalocyanine ($TiCl_2Pc$) is hydrolyzed to obtain α-type titanyl phthalocyanine. It is desirable to process it after that by 2-ethoxyethanol, diglyme, dioxane, tetrahydrofuran, N,N-dimethyl form amide, N-methyl pyrrolidone, pyridine, morpholine, and other solvents which are electron donors.

Then the α-type titanyl phthalocrynine is agitated or milled by mechanical straining force for sufficient period of time to convert the crystals at the temperature of 50°–180° C., desirably at 60°–130° C. to produce titanyl phthalocyaine according to this invention. As another method of producing the above α-type titanyl phthalocyanine, $TiCl_2Pc$ is dissolved in sulfuric acid or made sulfate desirably at the temperature below 5° C., which is poured into water or ice water for redeposition or hydrolysis.

It is desirable to use the titanyl phthalocyanine obtained as described above in a dry condition but it may be used in the form of wet paste. For the dispersive medium to be used for agitating and milling, those which are usually used for dispersion or emulsifying pigments, etc. such as glass beads, steel beads, alumina beads, flint stone, etc. can be cited. However, a dispersive medium is not always required. As an auxiliary agent for frictional crushing, those used as auxiliary agents for frictional crushing of pigments such as common salt, sodium bicarbonate, Glauher's salt, etc. can be cited. However, an auxiliary agent for frictional crushing is not always necessary.

When solvent is required for agitating, milling, or frictional crushing, those which are liquefied at the temperature at the time of agitating or milling may be used. For instance, it is desirable to select more than one of the solvents such as alcohol type solvent (such as glycerol, ethylene glycol, diethylene glycol) or polyethylene glycol type solvent, ethylene glycol monomethyl ether, ethylene glycol monoethyl ether, and other cellosoluble type solvents, ketone type solvents, esterketone type solvents, etc.

Representative equipment used for the crystal inversion processes are general agitating equipment such as homo-mixer, disperser, agitater, stirrer, kneader, Banbury mixer, ball mill, sand mill, attritor, etc.

Temperature range for crystal inversion processes is 50°–180° C., desirably 60°–130 ° C. As in usual crystal inversion processes, using crystalline germ is also effective.

In this invention, other carrier generating substances may be used jointly with the above described titanyl phthalocyanine. Carrier generating substances which may be used jointly with titanyl phthalocyanine are, for example, α-type, β-type, γ-type, x-type, τ-type, τ′-type, and η-type and η′-type titanyl or non-metallic phthalocyanine. In addition to the above ones, phthalocyanine pigment, azo pigments, anthraquinone pigments, parylene pigments, polycyclic quinone pigments, squaric acid methine pigments, etc. can be cited. The following is an example of Azo pigments.

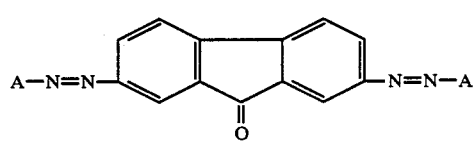 (I-1)
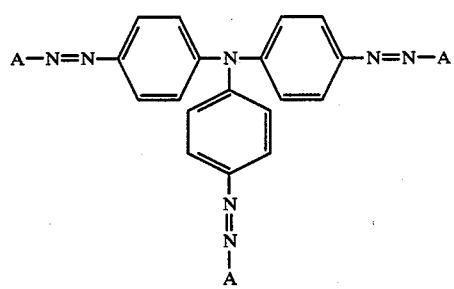 (I-2)
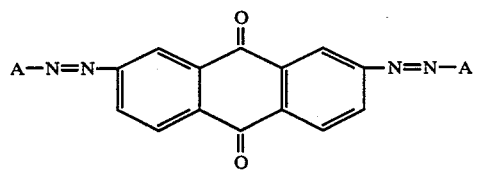 (I-3)
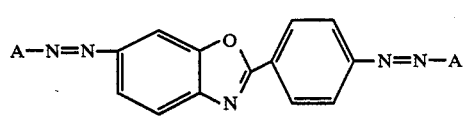 (I-4)
 (I-5)
 (I-6)
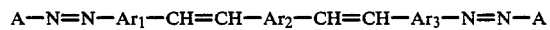 (I-7)
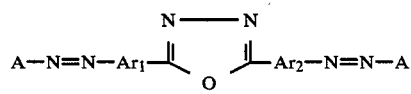 (I-8)
 (I-9)
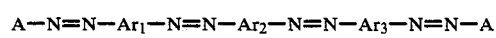 (I-10)
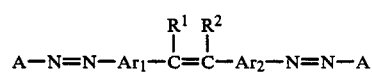 (I-11)
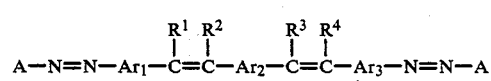 (I-12)
[where,
Ar$_1$, Ar$_2$ and Ar$_3$: substituted or unsubstituted carbocyclic aromatic ring respectively,
R$^1$, R$^2$, R$^3$ and R$^4$: Electron withdrawing group or atomic hydrogen. One of R$^1$-R$^4$ is electron withdrawing group such as cyano group, etc. A:
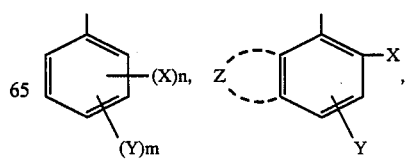

-continued

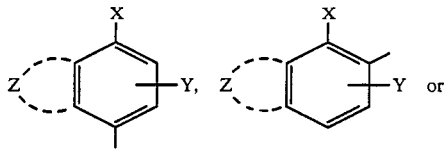

X is hydroxy group,

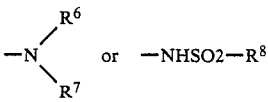

where,
R⁶ and R⁷ are atomic hydrogen or substituted or unsubstituted alkyl respectively and R⁸ is substituted or unsubstituted aryl.
Y is atomic hydrogen, halogen atom, substituted or unsubstituted alkyl, alkoxy, carboxyl, sulfo group, substituted or unsubstituted carbamoyl or substituted or unsubstituted sulfamoyl (however, when m is more than two, they may be different groups), Z is a group of atoms required to compose substituted or unsubstituted carbocyclic aromatic ring or substituted or unsubstituted heterocyclic aromatic ring, R⁵ is atomic hydrogen, substituted or unsubstituted amino group, substituted or unsubstituted carbamoyl, carboxyl or its ester group, A' is substituted or unsubstituted aryl, n is an integer of 1 or 2, and m is an integer of 0-4.)]

(I-1-1)
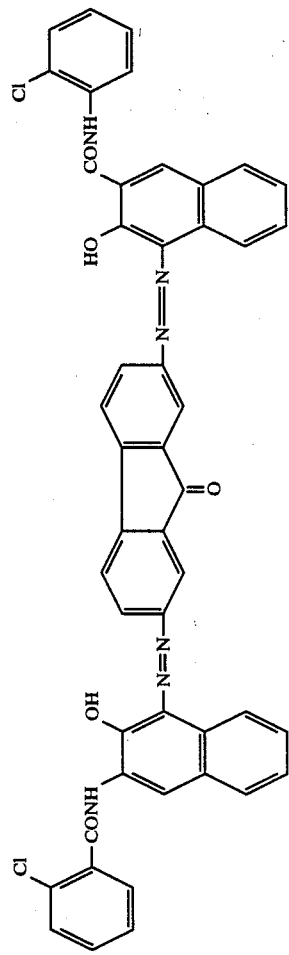
(I-1-2)
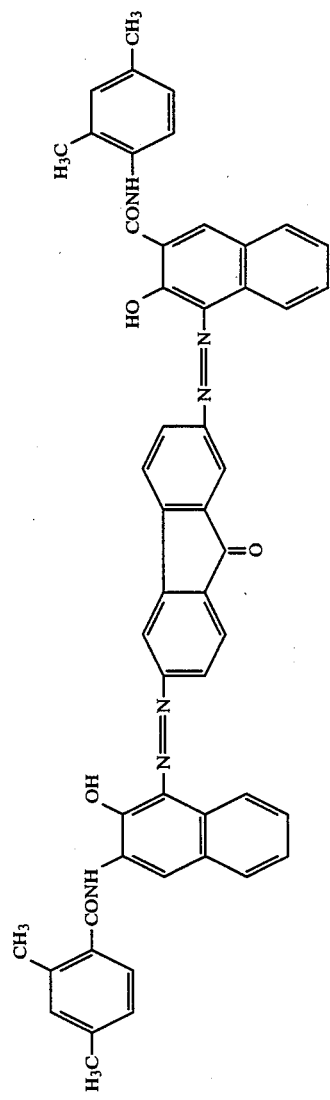

-continued
(I-2-1)
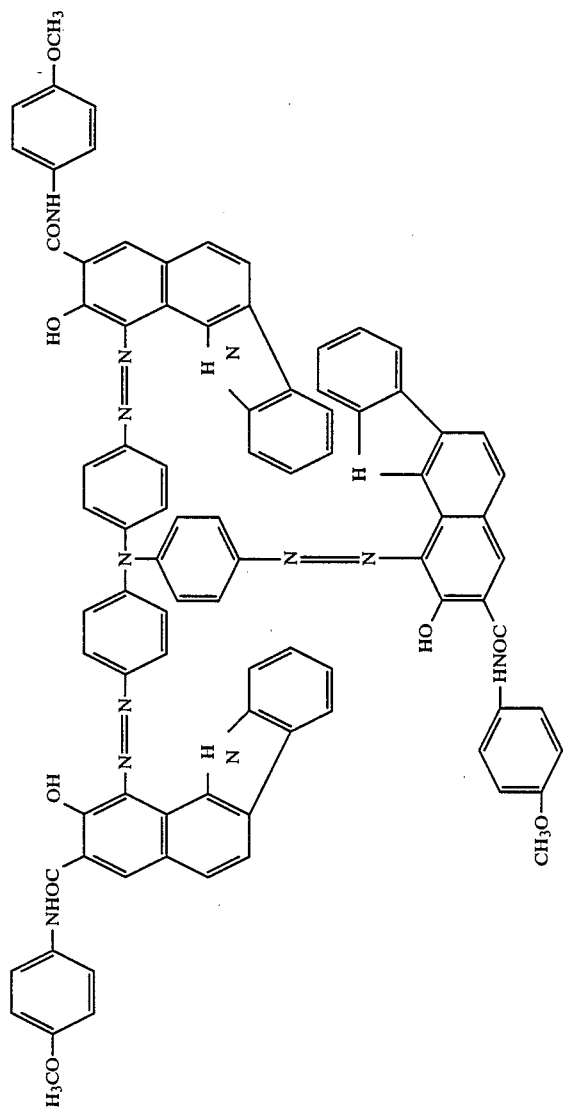
(I-3-1)
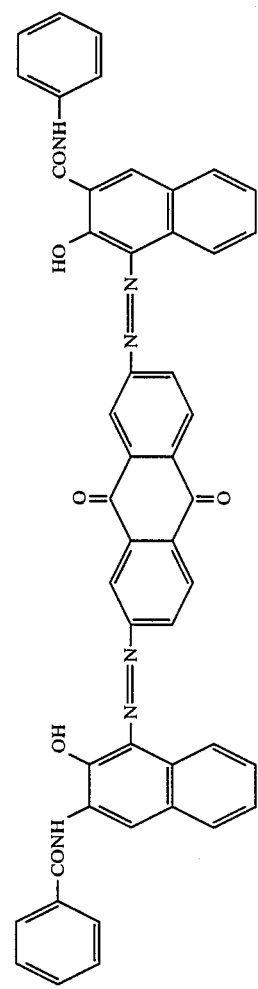

-continued
(I-4-1) 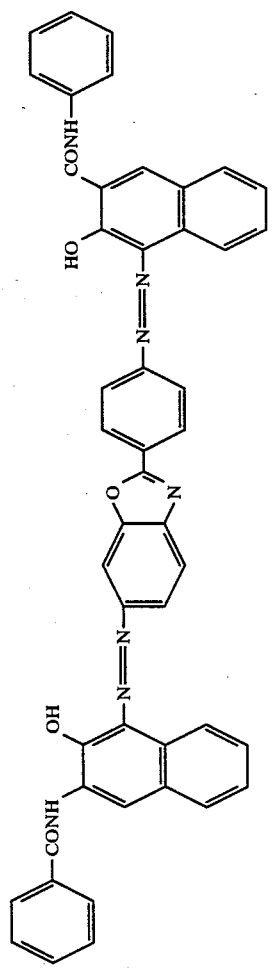
(I-5-1) 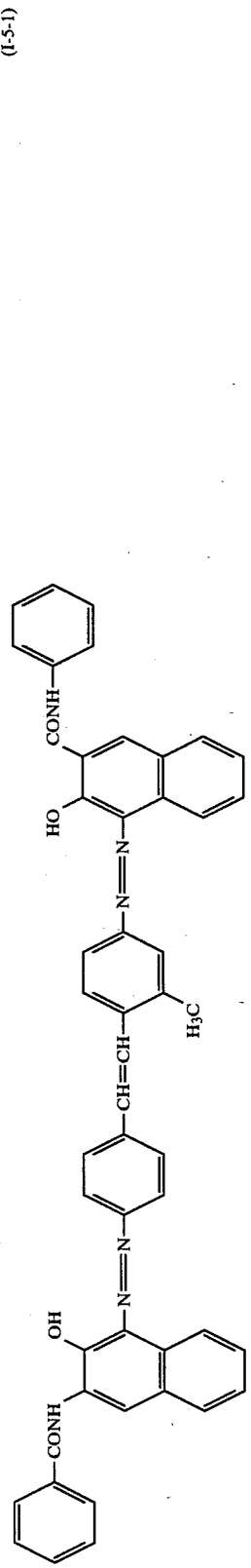
(I-6-1) 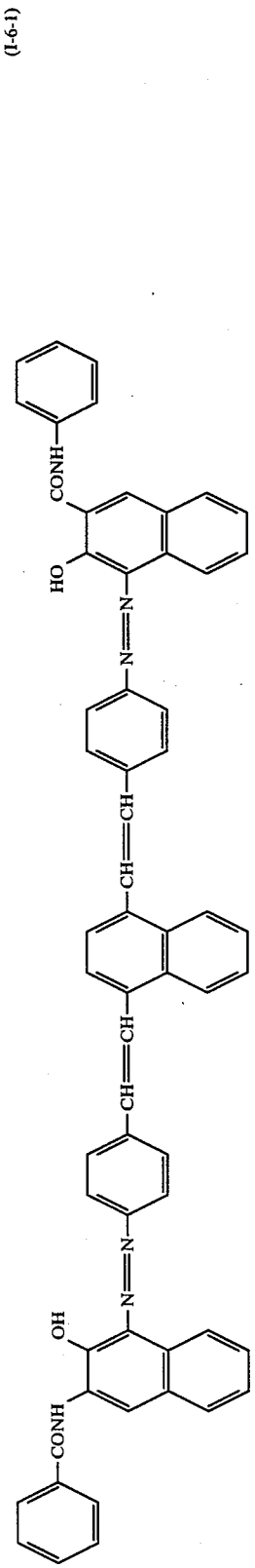
(I-7-1) 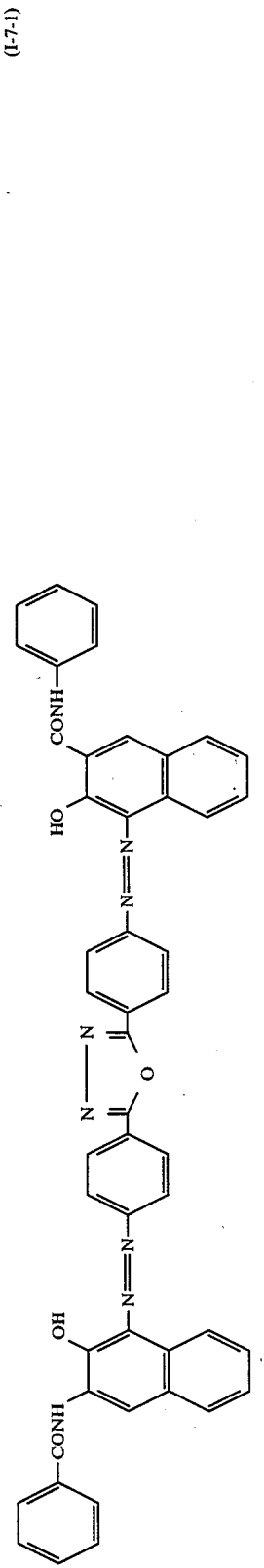

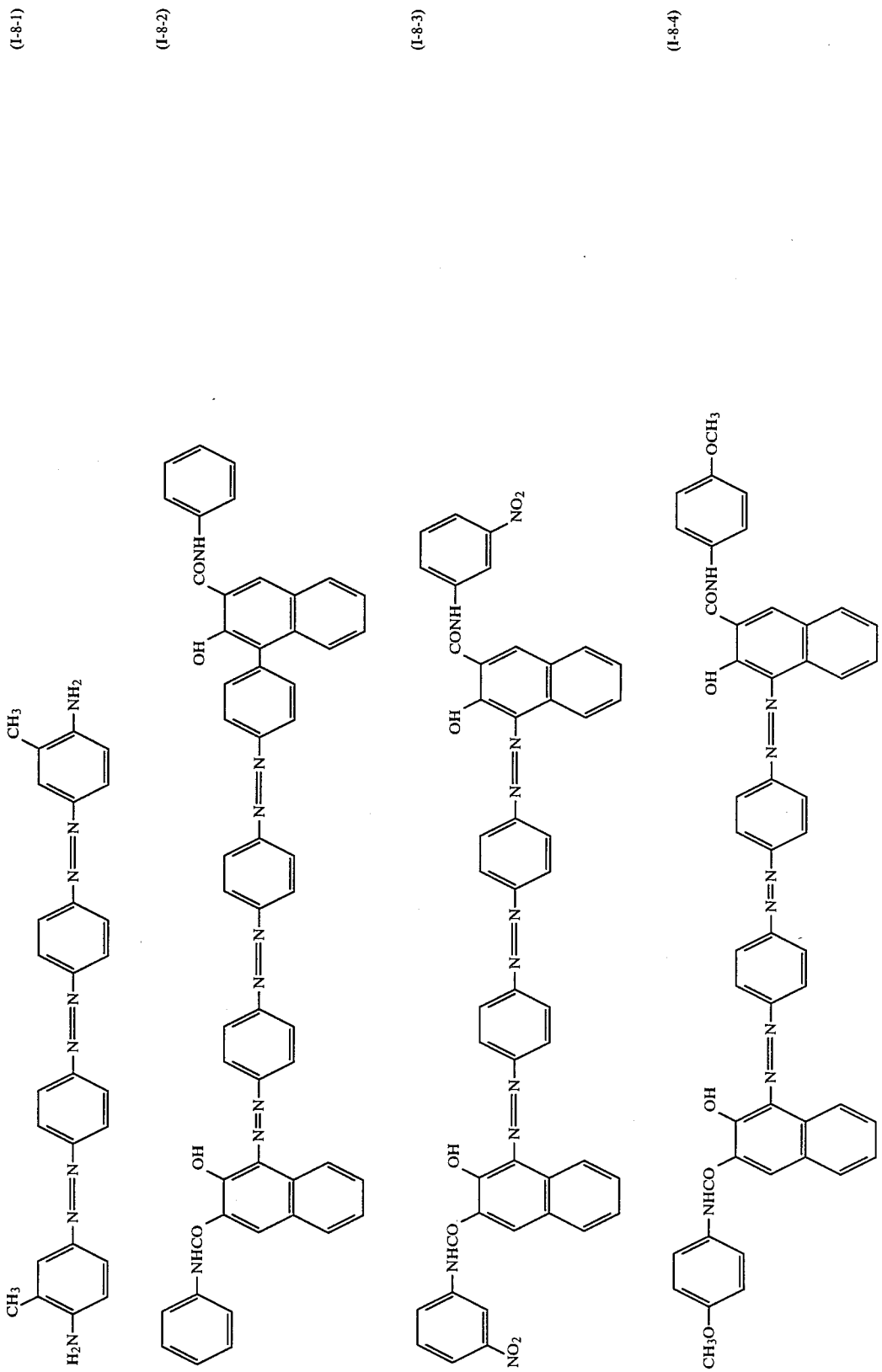

-continued
(I-8-5) 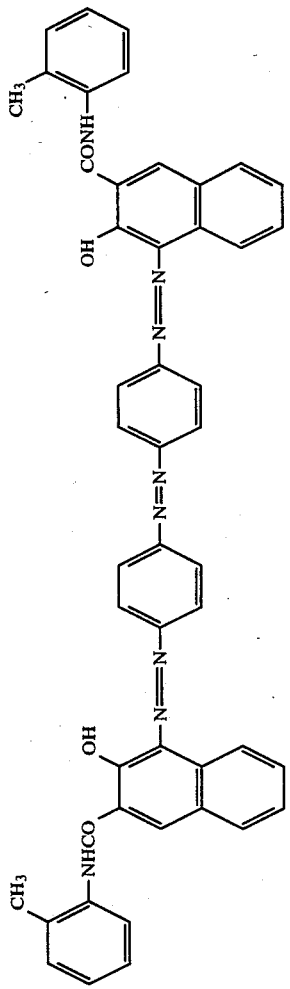
(I-9-1) 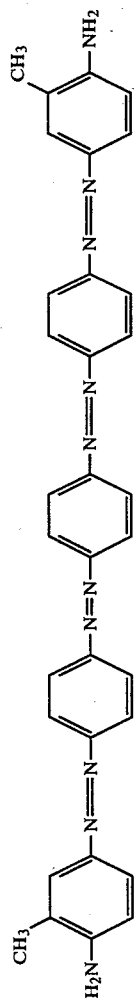
(I-9-2) 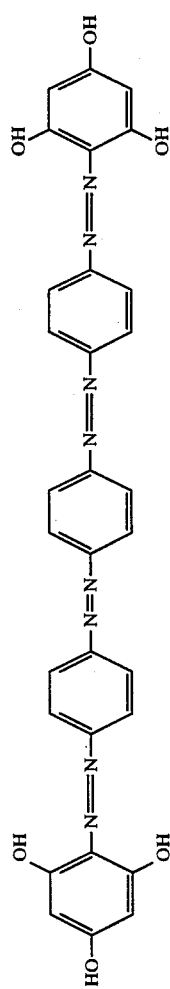
(I-9-3) 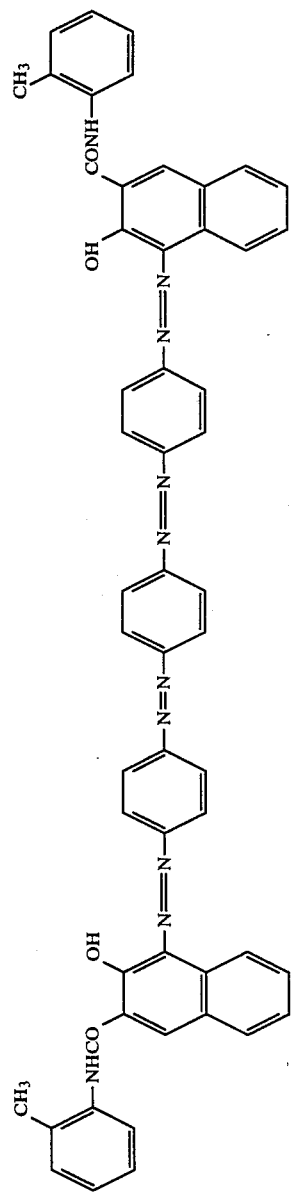

(I-9-4)
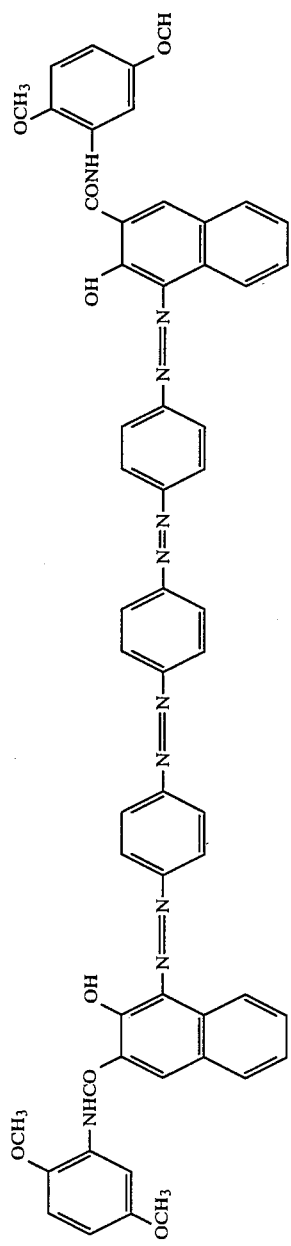
(I-9-5)
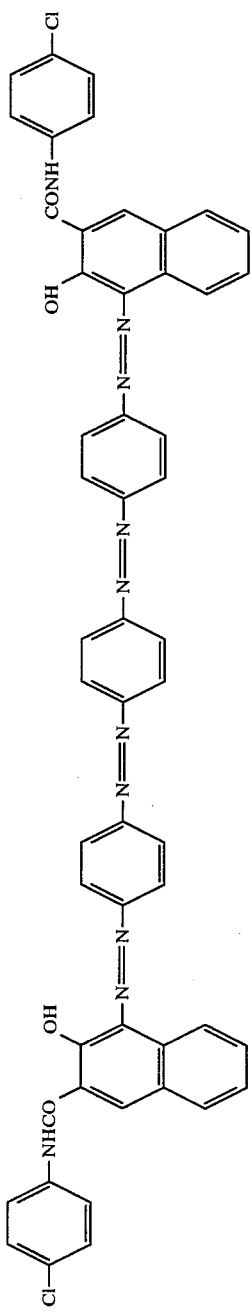
(I-10-1)
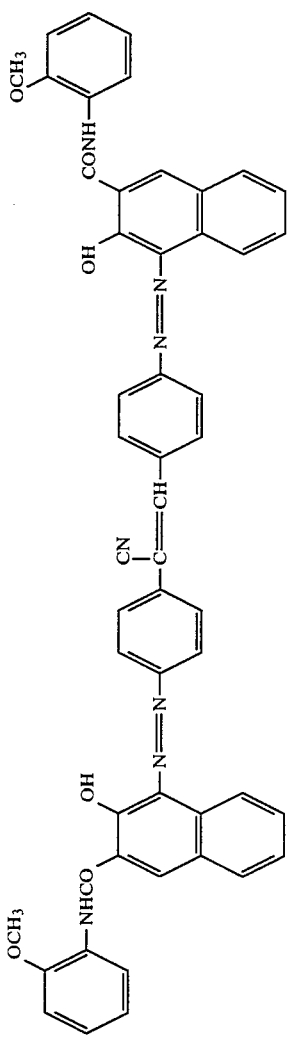

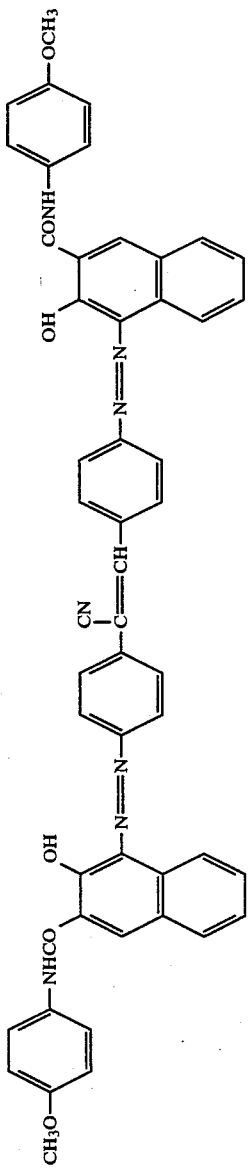
(I-10-2)
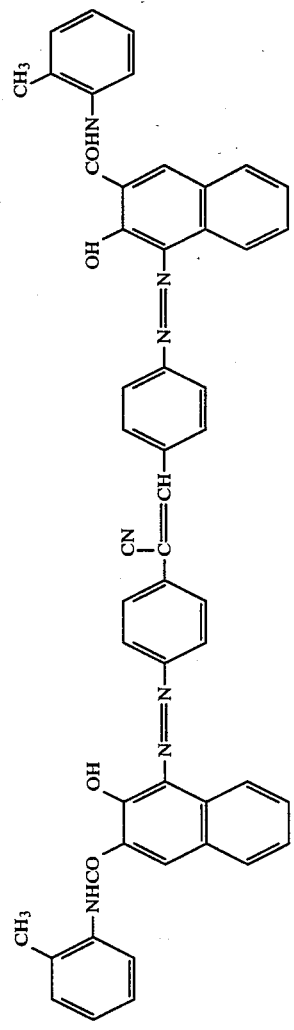
(I-10-3)
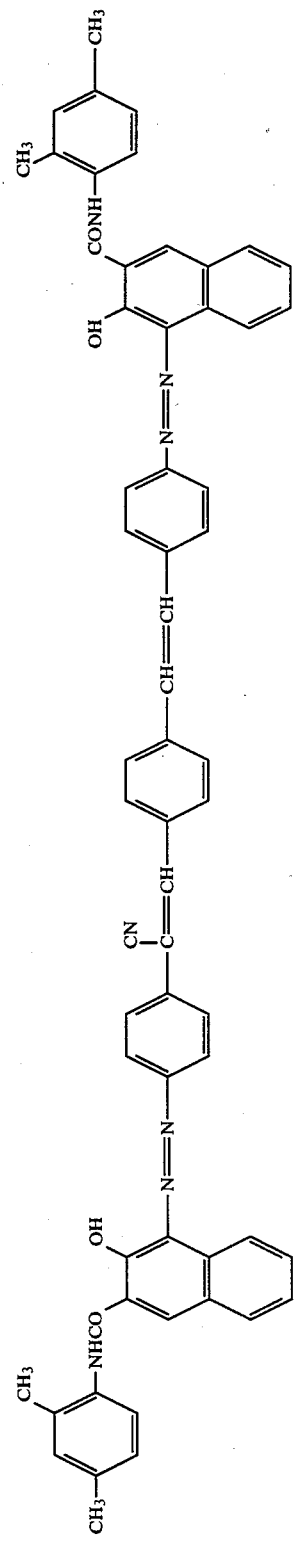
(I-11-1)

-continued
(I-11-2)
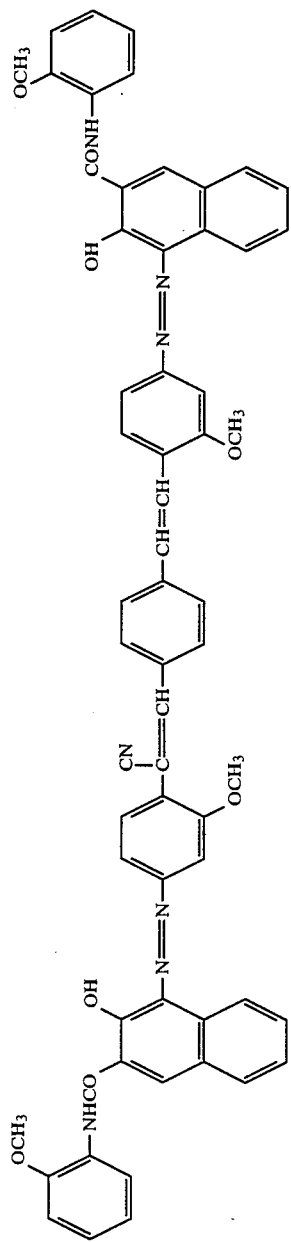
(I-11-3)
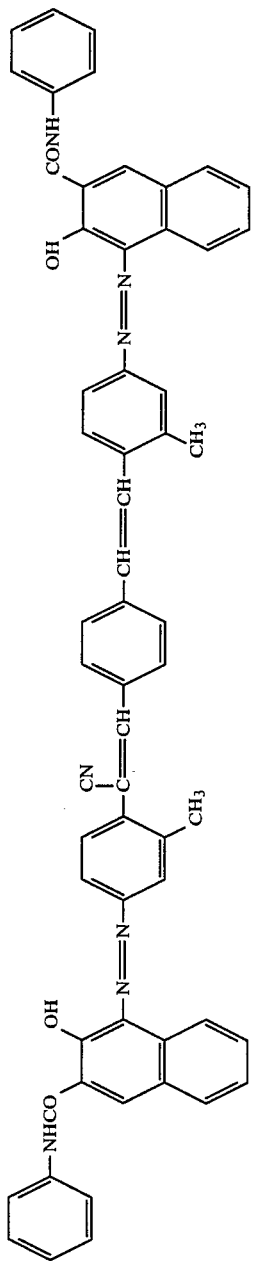
(I-11-4)
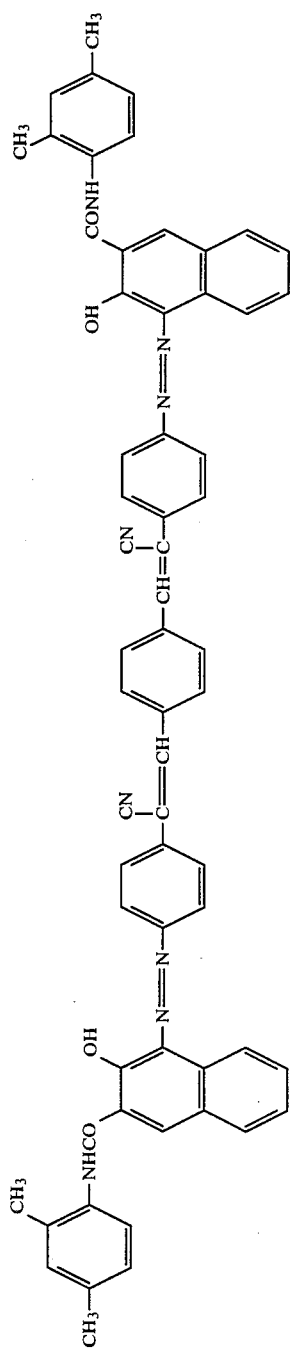

(I-11-5)
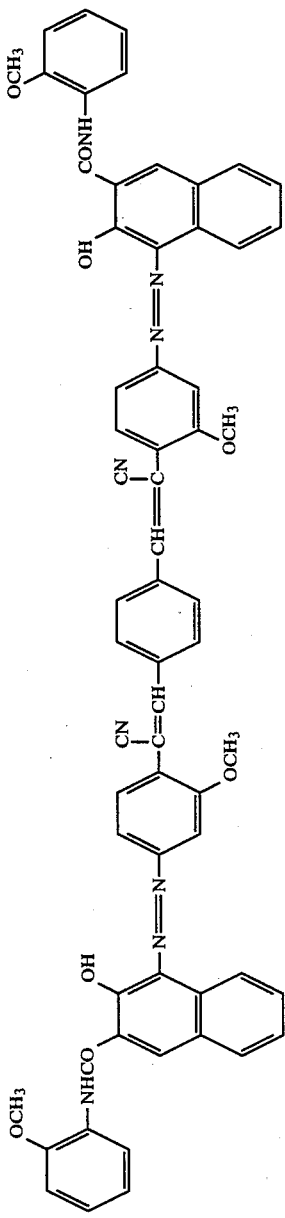
(I-11-6)
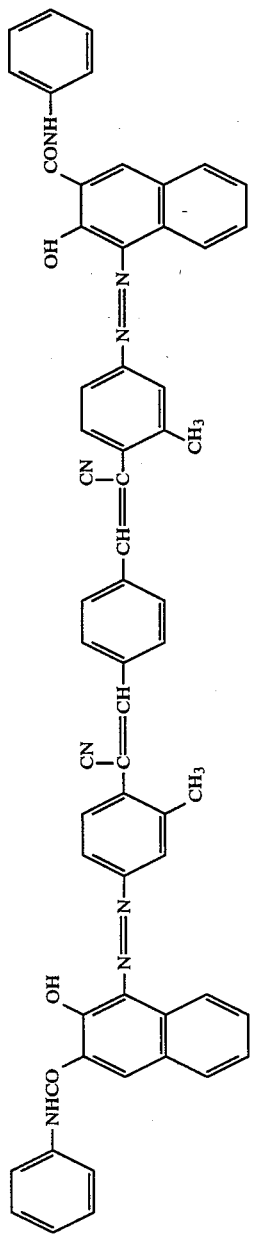
(I-12-1)
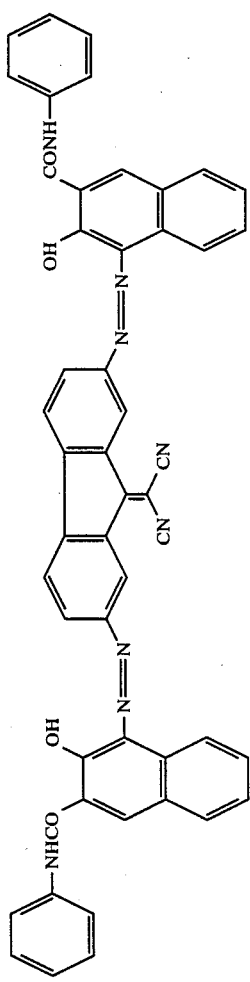

-continued
(I-12-2) 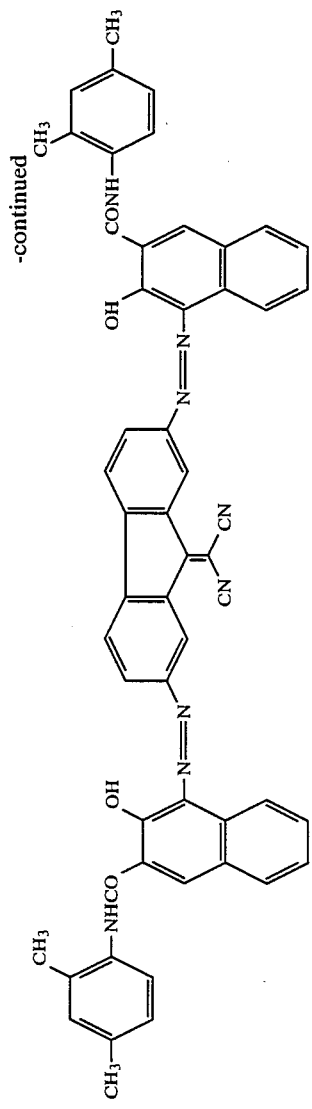
(I-12-3) 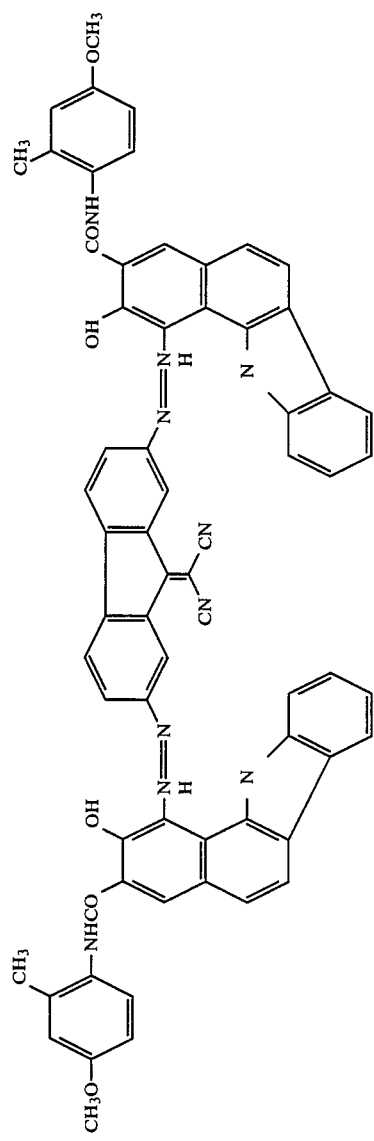
(I-12-4) 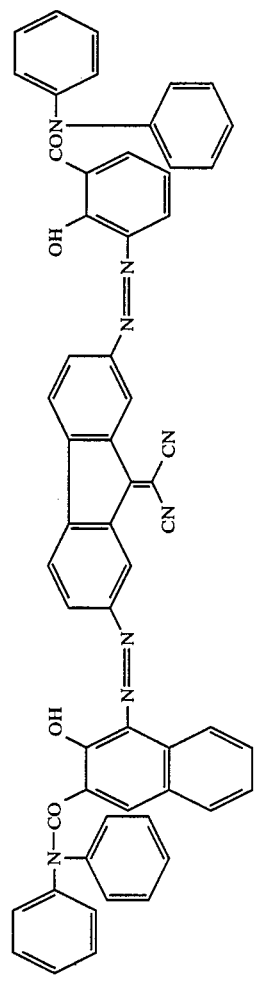

As polycyclic chinone pigments, compounds of the following general formula [II] can be cited. General formula [II]

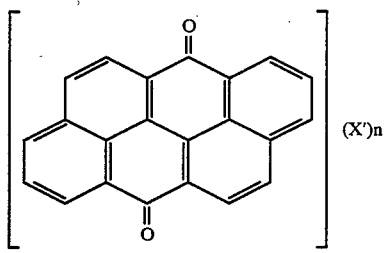

(In this general formula, X' presents halogen atom, nitro group, syano group or carboxyl and n is an integer of 0–4.)

Actual examples are shown below.

(II-1)
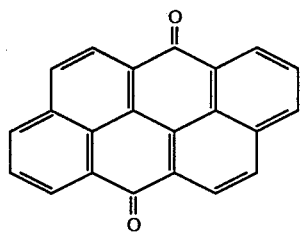

(II-2)
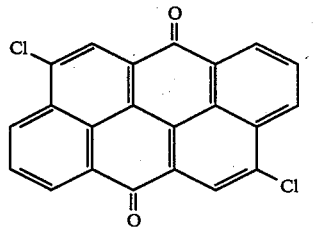

(II-3)
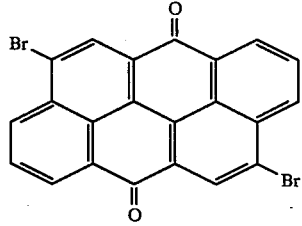

(II-4)
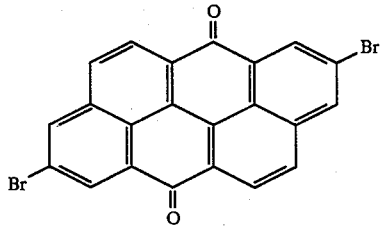

(II-5)
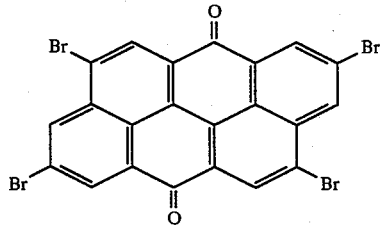

(II-6)
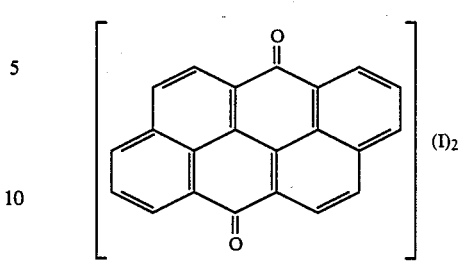

(II-7)
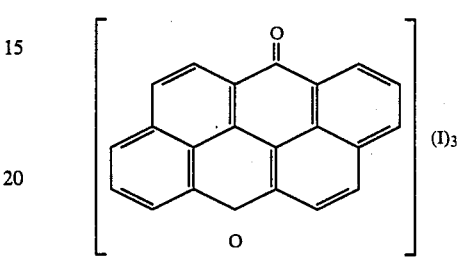

(II-8)
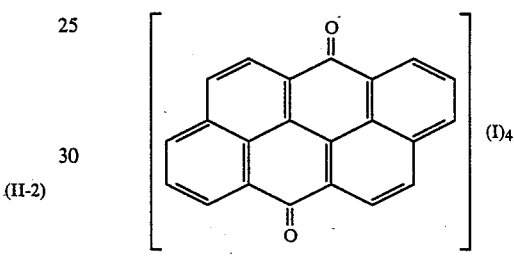

(II-9)
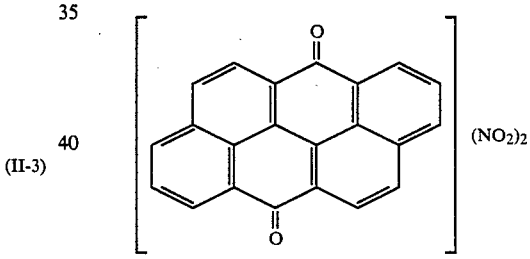

In the photoreceptors according to this invention, oxazole derivative, oxadiazole derivative, thiazole derivative, imidazole derivative, imidazolone derivative, imidazolizine derivative, bisimidazolizine derivative, styryl compound, hydrazone compound, pyrazolone derivative, oxazolone derivative, benzothiazole derivative, benzoimidazole derivative, quinazoline derivative, benzofuran derivative, acridine derivative, phenazine derivative, amino stilbene derivative, poly-N-vinyl carbazole, poly-1-vinyl pylene, poly-9-vinyl anthracene, etc. can be cited as carrier transporting substances used when separated function type photoreceptors are adopted.

Generally in photoreceptors, a carrier transporting substance effective with a certain carrier generating substance is not always effective with other carrier generating substances. Also a carrier generating substance effective with a certain carrier transporting substance is not always effective with other carriers. In order to use them as electrophotographic photoreceptors, the correct combination of a carrier generating substance and carrier transporting substance is necessary. An improper combination reduces sensitivity of the electrophotographic photoreceptor and especially due to the insufficient discharge efficiency in a low electric field, the rest potential increase. In the worst case, for instance when such an electrophoto- graphic photoreceptor is used for a duplicating machine, an electrical charge is accumulated while it is used repeatedly, and the toner stickes to areas other than the image, staining the base of the copy of damaging the clear duplicated image.

Thus, combining a carrier generating substance and carrier transporting substance is important. However, there are no specific general rules for selecting such combinations. Finding any carrier transporting substance suitable to a specific carrier generating substance is difficult.

According to a desirable embodiment of this invention, compounds expressed by the general formula [1] as follows are specifically useful for the purpose of this invention.

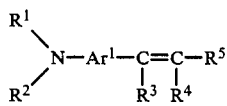

where, $R^1$, $R^2$: Substituted or unsubstituted alkyl or aryl. Alkyl includes methyl, ethyl, n-propyl, iso-propyl, n-buthyl, etc. and aryl includes phenyl group, naphthyl, etc. For substituted groups, alkyl such as methyl, ethyl, n-propyl, iso-propyl, n-buthyl, etc.; alkoxy such as methoxy, ethoxy, etc.; aryl such as phenyl; substituted amino group such as dimethylamino, diethylamino, etc.; hydroxyl group; halogen atom such as chlorine, bromine, etc. can be cited.

For substituted group of above alkyl and alkoxy, halogen atom such as chlor, aryl such as phenyl, alkenyl such as vinyl group, etc., can be cited.

$R^3$, $R^4$: Atomic hydrogen, halogen atom or substituted or unsubstituted aryl, alkyl or amino group. Actually, those cited for the above $R^1$ and $R^2$ are exemplified.

For substituted group, substituted or unsubstituted alkyl, alkoxy, amino group, aryl, hydroxyl group, halogen atom, etc. can be cited and actually those cited for the above $R^1$ and $R^2$ are exemplified.

$R^5$: Substituted or unsubstituted aryl or substituted or unsubstituted heterocyclic group.

For aryl, phenyl, naphthyl, anthranil, fluorenyl, etc. can be cited.

For substituted group, substituted or unsubstituted alkyl, alkoxy, aryl, substituted amino group, hydroxyl group, halogen atom, cyano group, etc. can be cited and actually those cited for the above $R^1$ and $R^2$ are exemplified.

$Ar^1$: Substituted or unsubstituted aryl.

For aryl, phenyl, etc. can be cited.

For substituted group, substituted or unsubstituted alkyl, alkoxy, amino group, aryl, hydroxyl group, halogen atom, etc. can be cited and actually those cited for above $R^1$ and $R^2$ are exemplified.

The inventor noticed that when using the above described titanyl phthalocyanine compound for photoreceptors as a carrier generating substance, one of the favorable characteristics can be obtained by selecting the said styryl compounds as the carrier transporting substance. In other words, by selecting the carrier transporting substance, supposedly for the reason that the ionization potential is suited to the titanyl phthalocyanine, the carrier is injected smoothly from the carrier generating substance to the oarrier transport substance. Therefore a favorable rest potential, sensitivity when used repeatedly, and charged electric potential are obtained.

Styryl compounds which are expressed by the above described general formula [1] are high in phase solubility to high-molecular binder. Even though the amount ratio to a high molecular binder is increased, no turbidity or opacity results. Therefore the mixing range of the high-molecular binder can be determined very widely and photoreceptors with favorable charge transport performance and characteristics can be produced. Due to the high phase solubility, the charge transport phase is uniform and stable. Resultantly, the photoreceptor which can form sharp images of high sensitivity and charge characters, free from fog, can be obtained. Especially when used for repeated transfer type electrophotography, they are subjected to no fatigue deterioration.

In addition, the charge transfer substances according to this invention are safe, favorable in terms of the environment, and the stable chemically.

As described above, this invention can provide photoreceptors with high sensitivity to long wavelength light, high in electric potential stability when used repetedly, high in charging ability, and core optimum for reversal development processes.

In the photosensitive layer comprising the photoreceptor, it is desirable that particle carrier generating substance and carrier transporting substance are combined by binder substance (that is, dispersed in the layer in the form of pigment). In such a case, printing resistance, durability, and other characters of the layer are improved, memory phenomonon is decreased, and rest potential becomes stable.

Styryl compounds which are expressed by the above-described general formula [1] will be described below.

Of compounds expressed by the above general formula [I], compounds expressed by the following general formula [Ia] are desirable.

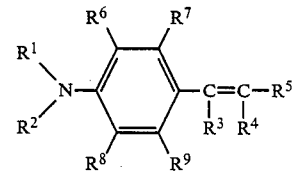

[where,
$R^1$, $R^2$, $R^3$, $R^4$, $R^5$: Same as above,
$R^6$, $R^7$, $R^8$, $R^9$: Hydrogen atom, halogen atom, hydroxyl group, substituted or unsubstituted alkyl, alkoxy, amino group, or aryl.]

As actual examples of the styryl compounds expressed by the above generyl formula [I], those of the following structural formula can be cited though not limited to them.

$$\begin{array}{c} R^1 \\ \phantom{R^1}\diagdown \\ \phantom{R^1}N-Ar^1-C=C-R^5 \\ \phantom{R^1}\diagup \phantom{N-Ar^1-}| \phantom{=}| \\ R^2 \phantom{\diagup N-Ar^1-}R^3 \phantom{=}R^4 \end{array}$$

| Compound No. | —R¹ | —R² | —R³ | —R⁴ | —Ar¹— | —R⁵ |
|---|---|---|---|---|---|---|
| I-1 | Ph | Ph | —H | Ph | p-C₆H₄ | Ph |
| I-2 | 3-CH₃-C₆H₄ | " | " | " | " | 3-CH₃-C₆H₄ |
| I-3 | 3-OCH₃-C₆H₄ | " | " | " | " | 3-OCH₃-C₆H₄ |
| I-4 | —CH₃ | —CH₃ | " | —H | " | Ph |
| I-5 | —C₂H₅ | —C₂H₅ | " | " | " | " |
| I-6 | " | " | " | " | " | 4-CH₃-C₆H₄ |
| I-7 | " | " | " | " | " | 4-OCH₃-C₆H₄ |
| I-8 | —CH₂—Ph | —CH₂—Ph | " | " | " | Ph |

-continued $$R^1\diagdown N-Ar^1-C=C-R^5 \atop R^2\diagup \quad\quad\ \ \ |\ \ \ |\ \atop \quad\quad\quad\quad\ \ R^3\ R^4$$

| Compound No. | —R¹ | —R² | —R³ | —R⁴ | —Ar¹— | —R⁵ |
|---|---|---|---|---|---|---|
| I-9 | —CH₂—C₆H₅ | —CH₂—C₆H₅ | —H | —C₆H₄— | —C₆H₄— | —C₆H₄—CH₃ |
| I-10 | —CH₂—C₆H₅ | —CH₂—C₆H₅ | —H | —C₆H₄— | —C₆H₄— | —C₆H₄—OCH₃ |
| I-11 | " | " | —H | " | —C₆H₃(OCH₃)— | —C₆H₄—OCH₃ |
| I-12 | —C₂H₅ | " | " | " | —C₆H₄— | " |
| I-13 | —C₆H₅ | —C₆H₅ | " | " | " | —C₆H₃(OCH₃)₂ |
| I-14 | " | " | " | " | " | —C₆H₄—CH₃ |
| I-15 | " | " | " | " | " | —C₆H₄—OCH₃ |

-continued
$$\begin{matrix} R^1 \\ \diagdown \\ N-Ar^1-C=C-R^5 \\ \diagup \quad\quad\quad | \quad | \\ R^2 \quad\quad\quad R^3 \; R^4 \end{matrix}$$
| Compound No. | —R¹ | —R² | —R³ | —R⁴ | —Ar¹ | —R⁵ |
|---|---|---|---|---|---|---|
| I-16 |  | " | " | " | " | 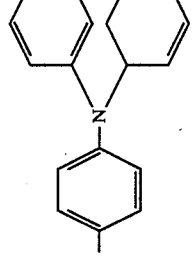 |
| I-17 | " | " | " | " | " | 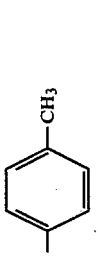 |
| I-18 | " | " | " | " | 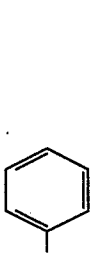 | 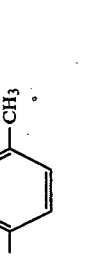 |
| I-19 | " | " | —H | —H | " | 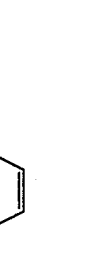 |
| I-20 | " | " | " | " | " |  |
| I-21 | " | " | —H | —H | " | |

-continued $$R^1 \atop R^2 N-Ar^1-C=C-R^5 \atop R^3 \; R^4$$

| Compound No. | —R¹ | —R² | —R³ | —R⁴ | —Ar¹ | —R⁵ |
|---|---|---|---|---|---|---|
| I-22 | " | " | —H | —H | 2-Cl-phenyl | phenyl |
| I-23 | " | " | " | " | 2-(C₂H₅)₂N-phenyl | 4-CH₃-phenyl |
| I-24 | " | 4-OCH₃-phenyl | " | " | phenyl | phenyl |
| I-25 | " | " | " | " | " | 4-CH₃-phenyl |
| I-26 | " | " | " | " | " | 4-OCH₃-phenyl |
| I-27 | " | " | " | " | 2-CH₃O-phenyl | phenyl |

-continued
$$R^1\!\!\diagdown_{\!\!N-Ar^1-C=C-R^5}^{\phantom{N}}\!\!\diagup^{R^4}_{R^3\ R^4}$$
| Compound No. | —R¹ | —R² | —R³ | —R⁴ | —Ar¹ | —R⁵ |
|---|---|---|---|---|---|---|
| I-28 | —C₂H₅ | —C₂H₅ | —H | —H | 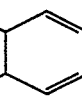 | 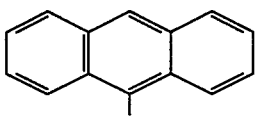 |
| I-29 | 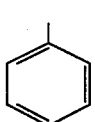—CH₂ | 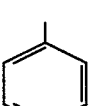—CH₂ | —H | —H | 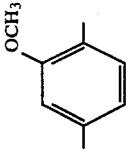 | 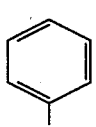 |
| I-30 | " | " | " | " | 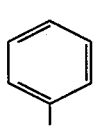 | " |
| I-31 |  | | | | | |

-continued $$R^1\!\!-\!\!N\!\!-\!\!Ar^1\!\!-\!\!\underset{R^3}{C}\!\!=\!\!\underset{R^4}{C}\!\!-\!\!R^5$$
$$R^2$$

| Compound No. | —R¹ | —R² | —R³ | —R⁴ | —Ar¹— | —R⁵ |
|---|---|---|---|---|---|---|
| I-32 | " | " | " | " | " | (2-biphenyl-N-CH₃) |
| I-33 | phenyl | phenyl | —H | —H | p-phenylene | 4-ethylphenyl |
| I-34 | phenyl | phenyl | —H | —H | p-phenylene | fluorenyl-CH₂ |
| I-35 | 4-methoxyphenyl | " | " | " | " | 4-methylphenyl |
| I-36 | " | " | " | " | " | 4-methoxyphenyl |
| I-37 | 4-methylphenyl | " | " | " | " | " |
| I-38 | 4-ethoxyphenyl | " | " | " | " | 4-methylphenyl |

-continued $$\begin{array}{c}R^1\\ \diagdown\\ R^2\end{array}N-Ar^1-\underset{\underset{R^3}{|}}{C}=\underset{\underset{R^4}{|}}{C}-R^5$$

| Compound No. | —R¹ | —R² | —R³ | —R⁴ | —Ar¹— | —R⁵ |
|---|---|---|---|---|---|---|
| I-39 | 4-OCH₃-C₆H₄— | C₆H₅— | " | " | 4-CH₃-C₆H₄— | 4-C₂H₅-C₆H₄— |
| I-40 | " | " | " | " | " | 4-C₃H₇-C₆H₄— |
| I-41 | " | " | " | " | " | 4-C₃H₇(iso)-C₆H₄— |
| I-42 | 4-OCH₃-C₆H₄— | C₆H₅— | —H | —H | 4-CH₃-C₆H₄— | 4-C₈H₁₇-C₆H₄— |
| I-43 | " | " | " | " | " | C₆H₅— |
| I-44 | " | " | " | " | " | 4-Cl-C₆H₄— |
| I-45 | " | " | " | " | " | 3,4-methylenedioxyphenyl |

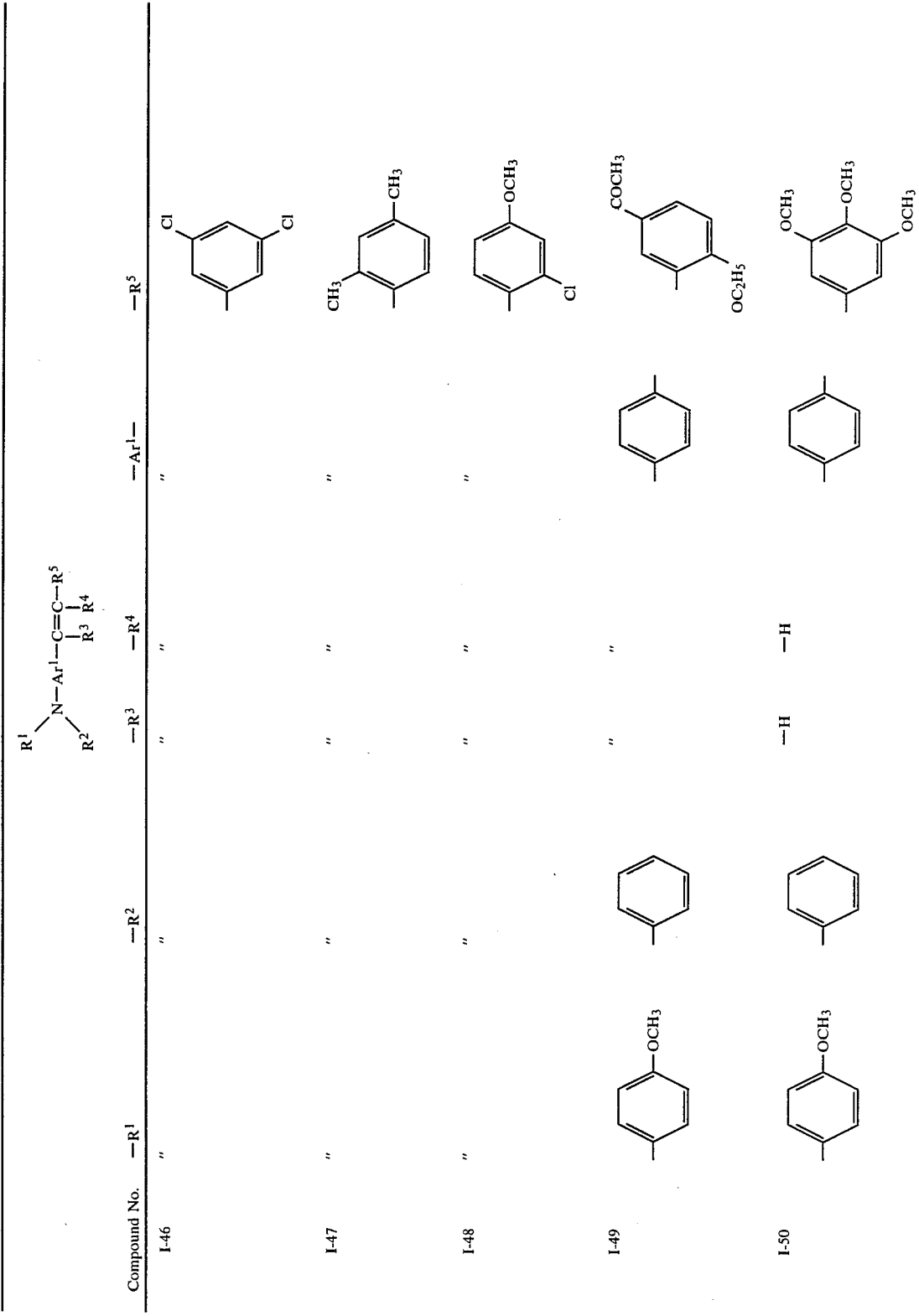

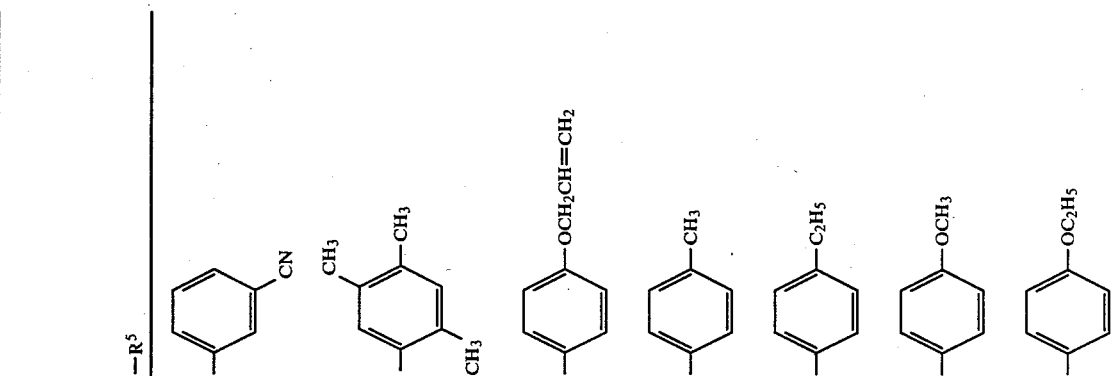

-continued $$R^1_{R^2}N-Ar^1-C=C-R^5_{R^3\ R^4}$$

| Compound No. | −R¹ | −R² | −R³ | −R⁴ | −Ar¹− | −R⁵ |
|---|---|---|---|---|---|---|
| I-58 | " | " | " | " | " | 4-(4-methylphenoxy)phenyl via OCH₂ linker (biphenyl ether, −OCH₂−C₆H₄−O−C₆H₄−) |
| I-59 | " | " | " | " | " | 4-isopropylphenyl (C₃H₇(iso)) |
| I-60 | " | " | " | " | " | 4-(OC₄H₉)phenyl |
| I-61 | " | " | " | " | " | 4-chlorophenyl |
| I-62 | " | " | " | " | " | 2-ethoxyphenyl (OC₂H₅) |
| I-63 | " | " | " | " | " | 3,4,5-tri(OC₂H₅)phenyl |

-continued $$\begin{matrix} R^1 \\ \phantom{R^1}\diagdown \\ \phantom{R^1}\phantom{\diagdown}N-Ar^1-C=C-R^5 \\ \phantom{R^1}\diagup\phantom{N-Ar^1-}|\phantom{=}| \\ R^2\phantom{\diagup}\phantom{N-Ar^1-C}R^3\phantom{=}R^4 \end{matrix}$$

| Compound No. | —R¹ | —R² | —R³ | —R⁴ | —Ar¹— | —R⁵ |
|---|---|---|---|---|---|---|
| I-64 | " | " | —H | —H | | 3-N(C₂H₅)₂-C₆H₄ |
| I-65 | 4-CH₃-C₆H₄ | C₆H₅ | —H | —H | p-C₆H₄ | 4-C₃H₇-C₆H₄ |
| I-66 | 4-OCH₃-C₆H₄ | 4-OCH₃-C₆H₄ | H | —H | " | 4-CH₃-C₆H₄ |
| I-67 | " | 4-CH₃-C₆H₄ | " | " | " | 4-OCH₃-C₆H₄ |
| I-68 | " | " | " | " | " | 4-C₂H₅-C₆H₄ |
| I-69 | " | " | " | " | " | 4-OC₂H₅-C₆H₄ |
| I-70 | " | " | " | " | " | 3-Cl-C₆H₄ |

-continued
$$\begin{matrix} R^1 \\ R^2 \end{matrix} N-Ar^1-\underset{R^3}{\underset{|}{C}}=\underset{R^4}{\underset{|}{C}}-R^5$$
| Compound No. | —R¹ | —R² | —R³ | —R⁴ | —Ar¹— | —R⁵ |
|---|---|---|---|---|---|---|
| I-71 | " | " | " | " | " |  |
| I-72 | " | " | " | " | " | 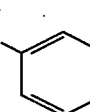 |
| I-73 | 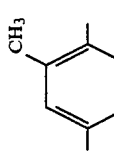OCH₃ | 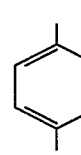CH₃ | —H | —H | CH₃ | 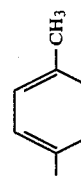OCH₂CH=CH₂ |
| I-74 | 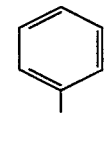OCH₃ | 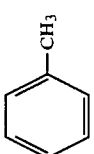 | " | " | 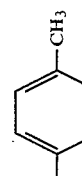 | 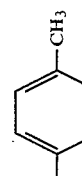CH₃ CH₃ |
| I-75 | CH₃ | " | " | " | " | " |
| I-76 | OCH₃ | CH₃ | " | " | " | " |

-continued $$R^1\diagdown N-Ar^1-C=C-R^5 \atop R^2\diagup \quad\quad R^3\ R^4$$

| Compound No. | —R¹ | —R² | —R³ | —R⁴ | —Ar¹— | —R⁵ |
|---|---|---|---|---|---|---|
| I-77 | 4-CH₃-C₆H₄— | C₆H₅— | " | " | " | 3,4-methylenedioxyphenyl |
| I-78 | 2,4-(CH₃)₂-C₆H₃— | " | —CH₃ | " | " | 2,5-(CH₃)₂-C₆H₃— |
| I-79 | 4-Cl-C₆H₄— | C₆H₅— | " | —H | " | 4-CH₃-C₆H₄— |
| I-80 | 4-CH₃-C₆H₄— | 4-CH₃-C₆H₄— | —H | —CH₃ | 4-CH₃-C₆H₄— | C₆H₅ |
| I-81 | 4-OCH₃-C₆H₄— | 4-OCH₃-C₆H₄— | " | " | 4-CH₃-C₆H₄— | C₆H₅ |

Figure 5:
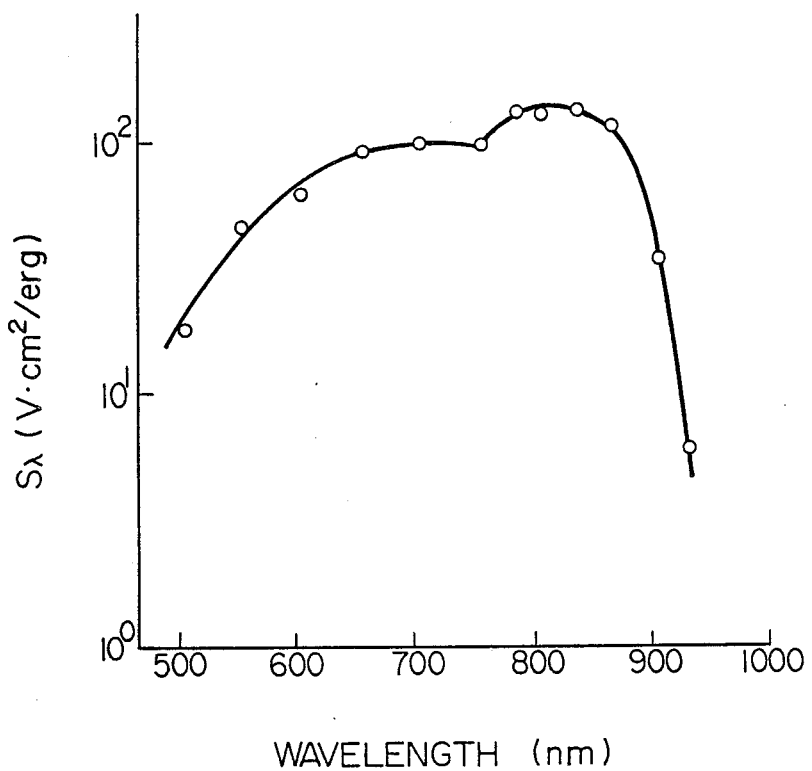
FIG. 5 shows spectral sensitivity of photoreceptor.
Figure 6:
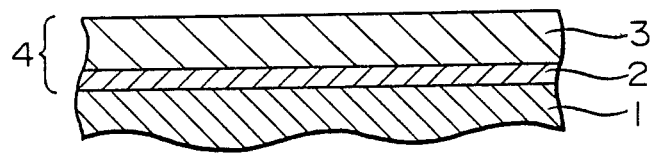
FIGS. 6, 7, 8, 9, 10, and 11 are sectional views showing actual examples of layer composition of electrophotographic photoreceptor according to this invention.
Figure 7:
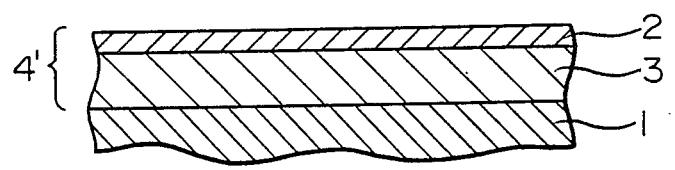
Figure 8:
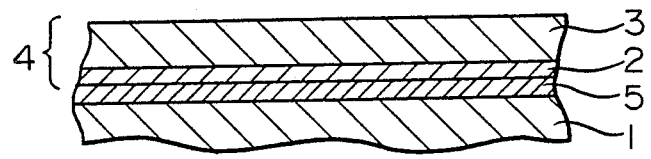
Figure 9:
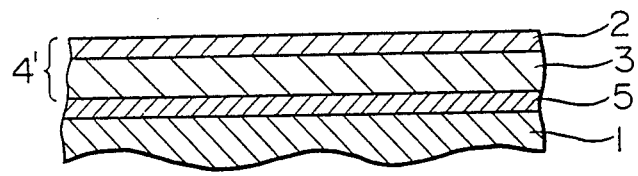
Figure 10:
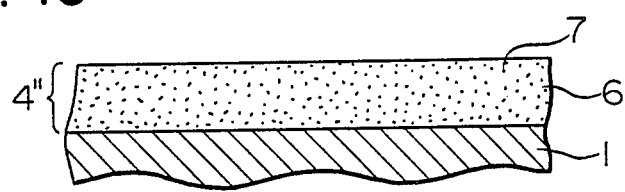
Figure 11:
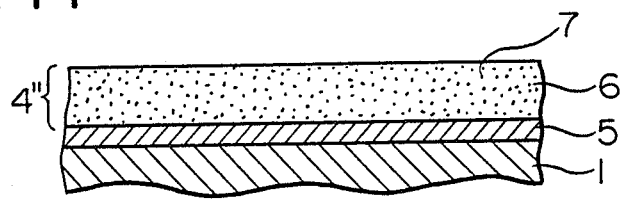

A photosensitive layer of the photoreceptor according to this invention may be composed by providing a layer with the said carrier generating substances dispersed in the binder on an electric conductive support. Or the so-called separate function type photosensitive layer of the laminated layer type or dispersion type may be provided by combining this carrier generating substance and carrier transporting substance. A photosensitive layer of the separated-function type is usually formed as shown in FIGS. 6–11. That is, the layer as shown in FIG. 6 is composed by forming the carrier generating layer 2 containing titanyl phthalocyanine according to this invention on the electric conductive support 1, and laminating the carrier transporting layer 3 containing the said carrier transporting substance to form the photosensitive layer 4. In FIG. 7, the photosensitive layer 4' is formed by reversing these carrier generating layer 2 and carrier transporting layer 3. In FIG. 8, the layer is composed by providing an intermediate layer 5 between the photosensitive 4 and electric conductive support 1 of the layer composition of FIG. 5. In FIG. 9, an intermediate layer 5 is provided between the photosensitive layer 4' and electric conductive support 1 of FIG. 7 to prevent injection of the free electron of the electric conductive support 1 respectively. In FIG. 10, the layer is composed by forming the photosensitive layer 4" containing the carrier generating substances 6 mainly such as titanyl phthalocyanine according to this invention and carrier transporting substance 7 combined with this. And in FIG. 11, above, the intermediate layer 5 is provided between this photosensitive layer 4" and electric conductive support 1.

When forming a photosensitive layer of the two-layer composition, a carrier generating layer 2 can be provided by the following methods:
(a) By coating a solution formed by dissolving carrier generating substance in some proper solvent or adding binder to it and mixing, or
(b) By coating a dispersing solution formed by grinding the carrier generating substance into fine particles with a ball mill, homo mixer, etc. in a dispersive medium and adding binder if necessary and mixing and dispersing.

Uniform dispersion is possible by dispersing particles under supersonic waves when using these methods.

For solvent or dispersive medium used to form the carrier generating layer, n-buthylamine, diethylamine, isopropanolamine, triethanolamine, triethylene diamine, N, N-dimethylformamide, acetone, methyl ethyl ketone, cyclohexanone, benzene, toluene, xylene, chloroform, 1, 2-dichloroethane, dichloromethane, tetrahydrofuran, dioxane, methanol, ethanol, isopropanol, ethyl acetate, buthyl estate, dimethyl sulfoxide, etc. can be cited.

When a binder is used to form the carrier generating layer or carrier transporting layer, it may be any type but especially high molecular polymer which has ability to form hydrophobic insulated film of high dielectric constant is desirable. Such polymers include the following ones but are not limited to them.
(a) Polycarbonate
(b) Polyester
(c) Methacrylate resin
(d) Acrylic resin
(e) Polyvinyl chloride
(f) Polyvinylidene chloride
(g) Polystyrene
(h) Polyvinyl acetate
(i) Styrene-butadiene copolymer
(j) Vinylidene chloride-acrylonitrile copolymer
(k) Vinyl chloride-vinyl acetate copolymer
(l) Vinyl chloride-vinyl acetate-maleic anhydride copolymer
(m) Silicone resin
(n) Silicone-alkyd resin
(o) Phenol-formaldehyde resin
(p) Styrele-alkyd resin
(q) Poly-N-vinyl carbazole
(r) Polyvinyl butyral
(s) Polycarbonate Z resin These binders may be used independently or as mixture of more than two types. The ratio of the carrier generating substance to the binder is 10–600 weight percent, desirably 50–400 weight percent and the carrier transporting substance desirably 10–500 weight percent. The thickness of the carrier generating layer 2 formed in this way is desirably 0.01–20 μm, and more desirably 0.05–5 μm and the thickness of the carrier transporting layer is 2–100 μm, desirably 5–3 μm.

When the above carrier generating substance is dispersed to form a photosensitive layer, it is desirable that the said carrier generating substance has particles less then 2 μm, desirably less than 1 μm, in average particle size. When the particle size is too large, the particles cannot be dispersed satisfactorily into the layer and some of particles may be projected beyond the surface deteriorating the smoothness of the surface. In some case, discharge may be caused at the projected particles or toner particles may stick there, causing toner coating phenomenon.

In addition, the said photosensitive layer may contain one or more kinds of electron acceptance substances for the purposes of improving the sensitivity, and reducing the rest potential or fatigue when used repeatedly. For electron acceptance substances which can be used here, succinic anhydride, maleic anhydride, dibromo succinic anhydride, phthalic anhydride, tetrachloro phthalic anhydride, tetrabromo phthalic anhydride, 3-nitro phthalic anhydride, 4-nitro phthalic anhydride, pyromellitic anhydride, mellitic acid anhydride, tetracyanoethylene, tetracyanoquinodimethane, 0-dinitrobenzene, m-dinitrobenzene, 1, 3, 5-trintrobenzene, paranitrobenzonitrile, picryl chloride, quinone chlorimide, chloranile, bulmanile dichlorodicyanoparabenzouinone, anthoraquinone, dinitroanthraquinone, 9-fluorenylidene malonodinitrile, polynitro-9-fluorenylidene maronodinitrile, picric acid, o-nitrobenzoic acid, p-nitrobenzoic acid, 3, 5-dinitrobenzoic acid, pentafluorobenzoic acid, 5-dinitro salicylic acid, phthalic acid, mellitic acid, and other compounds of high electron affinity can be cited. The rate of electron acceptance substance is 100:0.01–200 for the carrier generating substance to electron acceptance substance in volume, desirably 100:0.1–100.

For the support 1 to which the above photosensitive layer is provided, such ones that are composed by coating, evaporating or laminating metallic plate, metallic drum, or electric conductive polymer, indium oxide or other electric conductive compounds, or electric conductive thin layer composed of aluminum, palladium, gold, etc. to a base such as paper, plastic film, etc. are used. For the intermediate layer which functions as an adhesive layer or barrier layer, etc., such ones that are composed of high molecular polymer as explained as above binder resin, polyvinyl alcohol, ethyl cellulose, carboxymethyl cellulose, and other organic high molecular substances or aluminum oxide, etc. are used.

Photoreceptors according to this invention are obtained as described above. They have such characteristics that are optimum as semiconductor laser photoreceptors since the maximum value of the titanyl phthalocyanine used in this invention in the photosensitive wavelength region exits in 817 nm±5 nm and the titanyl phthalocyanine has very stable crystal form so that inversion to other crystal forms is hard to occur. These characteristics are very advantageous to production and application of electrophotographic photoreceptors.

With this invention, photoreceptors of photosensitive wavelength region optimum to light of the middle wavelength region, and especially semiconductor lasers and LEDs can be obtained using original titanyl phthalocyanine according to this invention. The titanyl phthalocyanine according to this invention is excellent in crystal stability to solvents, heat, and mechanical straining force and high in sensitivity as photoreceptors, charging ability, and electric potential stability.

Examples of this invention will be described below with reference to Examples. Titanyl phthalocyanine according to this invention, and α-type titanyl phthalocyanine are described first.

SYNTHESISON EXAMPLE 1

Ten parts of α-type titanyl phthalocyanine, 5 to 20 parts of common salt as a friction grinding auxiliary agent, and 10 parts of polyethylene glycol as dispersing agent were placed in a sand grinder and ground frictionally at the temperature of 60°–120° C. for 7 to 15 hours. At this time, grinding at high temperatures facilitates presentation of β-type crystal form and decomposition. The compound was taken out of the vessel, the grinding auxiliary agent and dispersive medium were removed by water and methanol, and the compound was refined in 2% aqueous solution of dilute sulfuric acid, filtered, washed in water, and dried. A clear, greenwish blue crystal was obtained. This crystal was known to be the titanyl phthalocyanine according to this invention as shown in FIG. 1 as the result of X-ray diffraction and infrared spectroscopic analysis.

Figure 4:
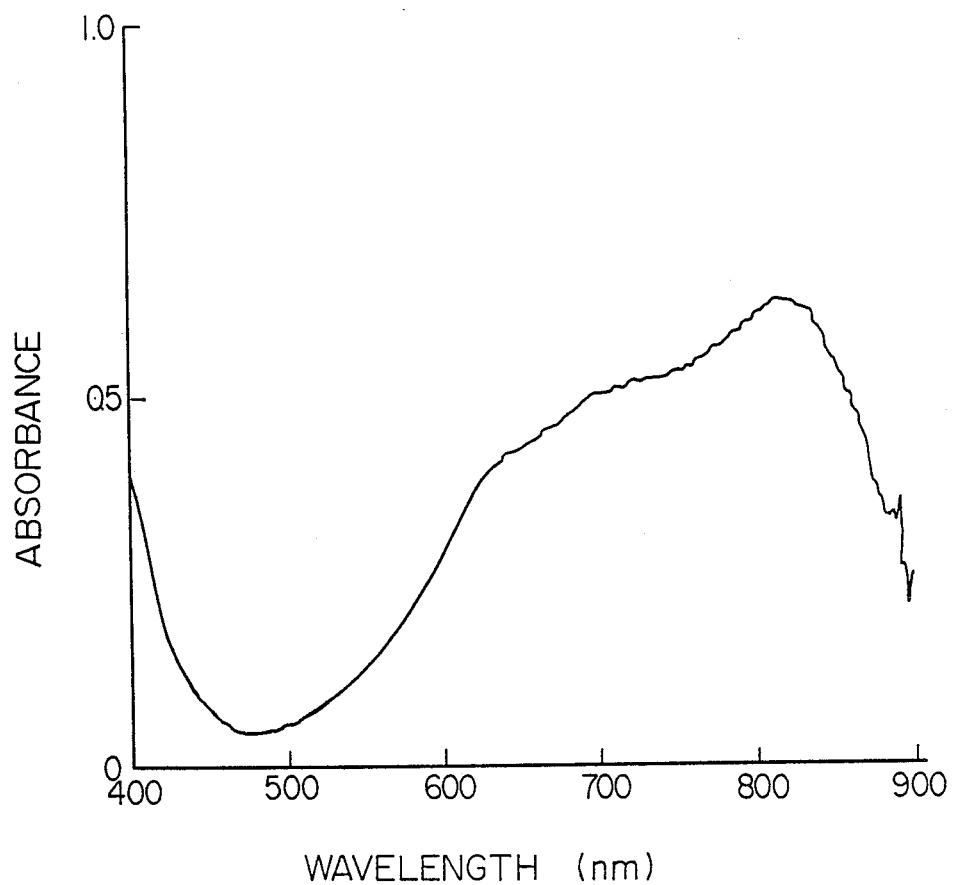
FIG. 4 is the absorption spectrum of titanyl phthalocyanine according to this invention.

The infrared absorption spectrum was as shown in FIG. 4. The maximum wavelength (λmax.) of the absorption spectrum is at 817±5 nm, different from λmax.=830 nm of α-type titanyl phthalocyamine.

SYNTHESIS EXAMPLE 2

Figure 2:
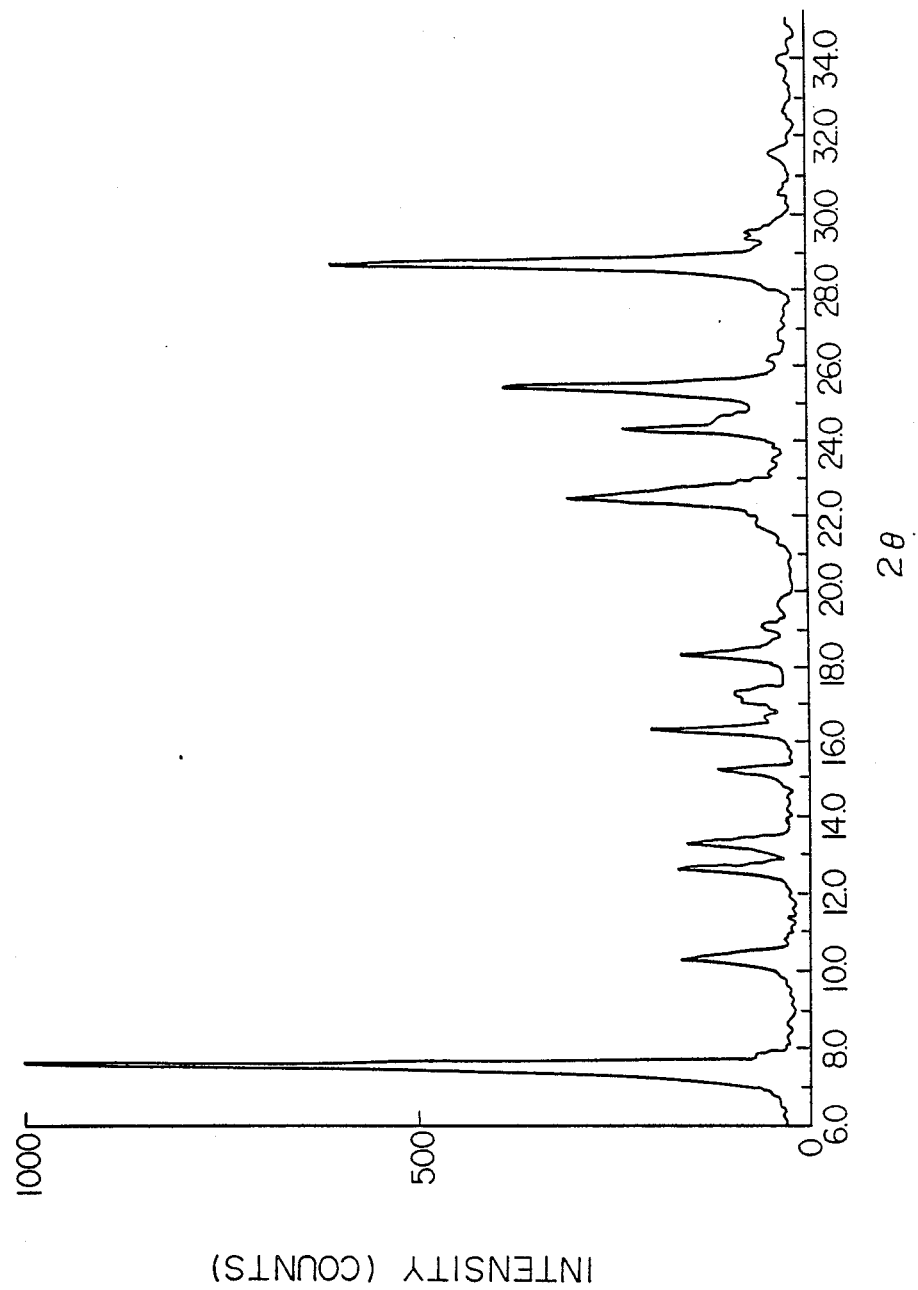
FIGS. 2 and 3 show the X-ray diffraction of 2 examples of α-type titanyl phthalocyanine.

Mixture of 40 g of phthalodinitrile, 18 g of titanium tetrachloride, and 500 ml of α-chloronaphthalene was heated and agitated under nitrogen current at the temperature of 240°–250° C. for 3 hours until reaction was completed. Then the mixture was filtered and dichloro titanium phthalocyanine was obtained as the product. Mixture of this dichloro titanium phthalocyanine and 300 ml of undiluted ammonia water was heated and refluxed for 1 hour and the desired titanyl phthalocyanine of 18 g was obtained. The product was sufficiently washed by acetone in a Soxhlet extractor. The product was α-type titanyl phthalocyanine as shown in FIG. 2.

SYNTHESIS EXAMPLE 3

Figure 3:
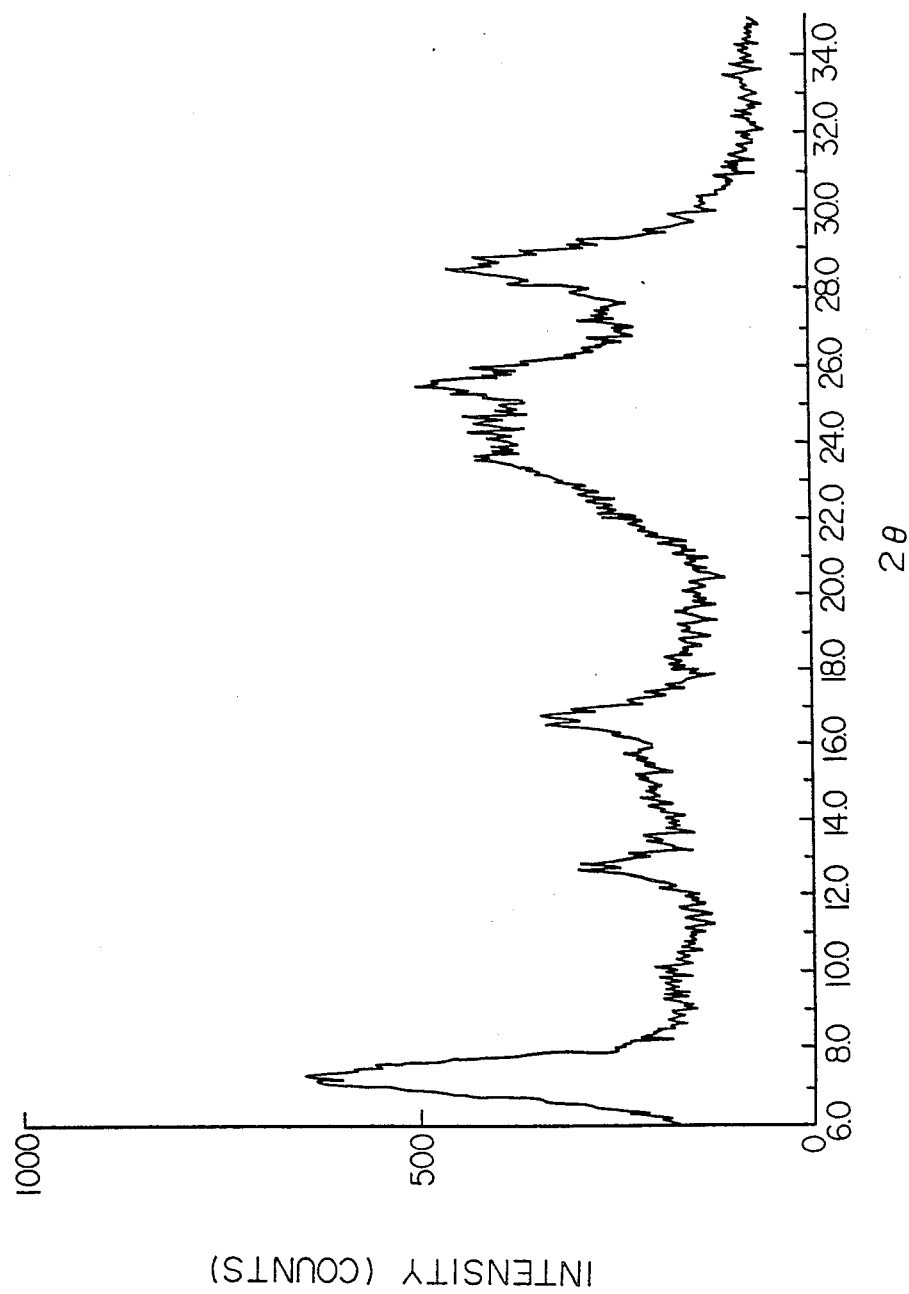

The titanyl phthalocyanine of the composition example 2 was processed by acid paste. α-type titanyl phthalocyanine of the spectrum as shown in FIG. 3 was obtained.

EXAMPLE 1

One part of titanyl phthalocyanine according to this invention as shown in the composition example 1, one part of dispertion binder resin, polyvinyl butyral resin (XYHL manufactured by Union Carbide), and 100 parts of tetrahydrofuran were dispersed for 15 minutes with a supersonic dispersing machine. The dispersed solution obtained was coated on an electric conductive support composed of polyester film deposited with aluminum with a wire bar to form charge generating layer of 0.2 μm in thickness.

On the other hand, 3 parts of compound of the structure as follows and 4 parts of polycarbonate resin (Panlite) L-1250, manufactured by Teijin Chemical) were dissolved in 30 parts of 1, 2-dichloroethane, a solution obtained was coated on the above-described charge generating layer and dried to form a charge transport layer of 18 μm in thickness, thus forming the electrophotographic photoreceptor according to this invention.

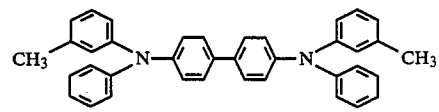

(Compound 1)

EXAMPLE 2

An electrophotographic photoreceptor same as that of the embodiment 1, except that charge transporting substance of the structure as follows was used instead of the one in the embodiment 1, was formed. The spectral distribution was good in the long wavelength region as shown in FIG. 5.

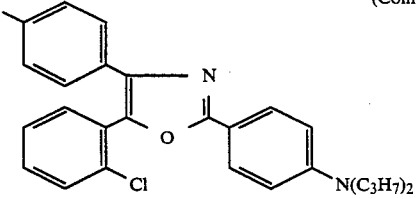

(Compound 2)

COMPARATIVE EXAMPLE 1

A photoreceptor to be used for comparison was formed as in the embodiment 1 except that a discharge generating substance (the one in the Synthesis Example 2) of the X-ray diffrection spectral in FIG. 2 was used.

COMPARATIVE EXAMPLE 2

A photoreceptor 2 was formed as in the Example 1 except that a discharge generating substance (that of Synthesis Example 3) of the X-ray diffraction spectrum diagram as shown in FIG. 3 was used for the charge generating substance.

EXAMPLE 3

An intermediate layer of 0.1 μm in thickness composed of vinyl chloride-vinyl acetate-maleic anhydride copolymer (SLEC NF-10, manufactured by Sekisui Chemical) was formed on the polyester which was laminated with aluminum foil.

As CGM, titanyl phthalocyanine according to this invention was ground with a ball mill for 24 hours, 1, 2-dichloroethane solution containing 6 weight percent of polycarbonate resin (Panlite) L-1250, Teijin Chemical) was added until the ratio of titanyl phthalocyanine to polycarbonate resin becomes 30 to 100 (weight ratio) and the compound was dispersed for 24 hours with a ball mill. In this dispersion solution, CTM (Compound 1) of 75 weight percent to the polycarbonate resin was added and a compound prepared to obtain monochlorobenzene/1, 2-dichloroethane of 3/7 (volume ratio) was coated to the above-described intermediate layer by spraying to form a photoreceptor layer of 20 μm in thickness and thus a sample of photoreceptor according to this invention was obtained.

EXAMPLE 4

An intermediate layer completely the same as that of the embodiment 1 was formed on polyester film laminated with aluminum foil.

Then, 1, 2 dichloroethane solution containing 16.5 weight percent of CTM (Compound 2)/polycarbonate resin (Panlite) L-1250, Teijin Chemical) of 60/100 (weight ratio) was coated on the above-described layer by dipping, and dried to obtain a CTL of 15 μm in thickness. Then, as CGM, titanyl phthalocyanine according to this invention was ground by a ball mill for 24 hours, 1, 2-dichloroethane solution containing 6 weight percent of polycarbonate resin (Panlite) L-1250, Teijin Chemical) was added until the ratio of titanyl phthalocyanine to polycarbonate resin becomes 30/100 (weight ratio), and the compound was dispersed by the ball mill for 24 hours. In this dispersed solution, CTM (Compound 2) of 75 weight percent to the polycarbonate resin was added, and monochlorobenzene was also added so as to obtain monochlorobenzene/1, 2-dichloroethane at the ratio of 3/7 (volume ratio), which was coated on the above-described intermediate layer by spraying to form a photosensitive layer of 5 μm in thickness. Thus a sample of the photoreceptor according to this invention was obtained.

Each photoreceptor obtained in this way was mounted to an electrostatic tester, "EPA-8100" (manufactured by Kawaguchi Denki Seisakusho) and a characteristic test was conducted as follows.

Electrophotographic characteristics were tested using Electrometer, model SP-428 (manufactured by Kawaguchi Denki Seisakusho) by measuring acceptance electric potential, VA (volt) when the photoreceptor surface is charged by a charging voltage of $-6K$ or $+6K$ volt for 5 seconds, light exposure E1/2 (lux, second) required for attenuating the electric potential $V_1$ (initial electric potential volt) after dark-attenuating for 5 seconds to 1/2, and dark attenuation ratio (D.D=$(V_A-V_1)/V_1 \times 100$ (%).

Next, after charging the photosensitive layer by corona discharge for 5 seconds applying a voltage of $-6KV$ or $+6KV$ to the charged electricity, it was left for 5 seconds (the electric potential at this time is called the initial electric potential). Then the light of a xenon lamp was separated into its spectral components so that the light intensity on the photoreceptor surface is 5 erg/cm²·sec. A light of 780 nm in wavelength was irradiated, and light exposure required to attenuate the initial electric potential from $+600$ or $-600$ volts to $+300$ or $-300$ volts, $E_{300}^{600}$ (erg/cm²) was measured.

The result is shown in Table 1 below.

TABLE 1

|  | $V_A$ (V) | $V_I$ (V) | $E_{\frac{1}{2}}$ (lux · sec) | D.D (%) | $E_{\frac{1}{2}}$ (erg/cm²) |
|---|---|---|---|---|---|
| Example 1 | −650 | −475 | 0.3 | 26.9 | 1.5 |
| Example 2 | −800 | −640 | 0.4 | 20.0 | 2.1 |
| Comparative Example 1 | −250 | −50 | — | 80.0 | — |
| Comparative Example 2 | −400 | −150 | 2.1 | 62.5 | — |
| Example 3 | 750 | 530 | 0.7 | 29.3 | 3.5 |
| Example 4 | 890 | 650 | 1.0 | 27.0 | 4.3 |

It is known from the above result that the photoreceptor according to this invention is excellent in the long wavelength sensitivity, in electric potential stability when used repeatedly, and in charge ability.

Next, an example of application to reversal development is described.

Six types of photoreceptors as described in the Examples 1–4 and Comparative Examples 1 and 2 were installed to a modified laser printer LP-3010 (manufactured by Konishiroku Photo Industry), reversal-developed using two-component developer containing plus or minus toner at plus or minus charge respectively, images were formed repeatedly 1000 times, density of each image and black spots on the white base were judged at 3 steps, "◯", "Δ", and "x". The result is shown in Table 2 below. As a light source, a semiconductor laser (780 nm) and LED (680 nm) were used.

TABLE 2

|  | Light source | Image density | Amount of black spots on white base |
|---|---|---|---|
| Example 1 | Semiconductor laser | ◯ | ◉ |
| Example 2 | Semiconductor laser | ◉ | ◉ |
| Example 3 | LED | ◯ | ◯ |
| Example 4 | LED | ◉ | ◯ |
| Comparative Example 1 | Semiconductor laser | x | x |
| Comparative Example 2 | LED | x | x |

The amount of the black spots was classified as follows:
◉: 0 pc/cm²
◯: Less than 3 pcs/cm²
x: More than 3 pcs/cm²
The image density was measured by Sakura meter, Model PDA-65.
◉: Reflection density more than 1.0
◯: Reflection density 0.6–1.0
x: Reflection density less than 0.6

As described above, it is known that the photoreceptor according to this invention is ideal for the reversal development.

EXAMPLES 5–12

One part of titanyl phthalocyanine according to this invention in the composition example 1, dispersion binder resin, one part of polyvinyl butyral resin ("XYHL", manufactured by Union Carbide), and 100 parts of tetrahydrofuran were dispersed using an ultrasonic dispersing machine. Dispersed solution obtained was coated on an electric conductive support composed of polyester film deposited with aluminum with a wire bar to form carrier generating layer of 0.2 μm in thickness.

On the other hand, 3 parts of a compound as shown in Table 3 below (carrier transporting substance and 4 parts of polycarbonate resin "Panlite) L-1250", manufactured by Teijin Chemical) were dissolved in 30 parts of 1, 2-dichloroethane, solution obtained was coated on the above-described carrier generating layer and dried to form a carrier transporting layer of 18 μm in thickness and thus an electrophotographic photoreceptor according to this invention was formed.

COMPARATIVE EXAMPLE 3

An electrophotographic photoreceptor same as the one in the Example 5 was formed except that a carrier transporting substance of the structure below was used instead of the one in the Example 1.

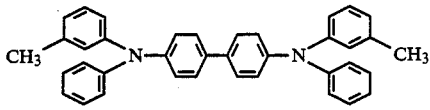

(Compound 1)

COMPARATIVE EXAMPLE 4

An electrophotographic photoreceptor same as the one in the Example 5 was formed except that a carrier transporting substance of the structure below was used instead of the one in the Example 5. In the spectral distribution of this photoreceptor, sensitivity for the long wavelength was good as shown in FIG. 5.

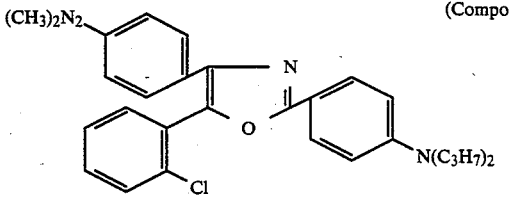

(Compound 2)

COMPARATIVE EXAMPLE 5

A photoreceptor for comparison was formed in the same way as in the Example except that a carrier generating substance (the one in the Synthesis Example 2) with the X-ray diffraction spectrum diagram as show in FIG. 2 was used as the carrier generating substance.

COMPARATIVE EXAMPLE 6

A photoreceptor for comparison was formed in the same way as in the Example except that a carrier generating substance (the one in the Synthesis Example 3) with the X-ray diffraction spectrum diagram as shown in FIG. 3 was used as the carrier generating substance.

EXAMPLE 13

An intermediate layer of 0.1 μm in thickness composed of vinyl chloride - vinyl acetate - maleic anhydride copolymer (SLEC MF-10, Sekisui Chemical) was formed on polyester laminated with aluminum foil.

Then, as CGM, titanyl phthalocyanine according to this invention was ground with a ball mill for 24 hours, 1, 2-dichloroethane solution containing 6 weight percent of polycarbonate resin (Panlite) L-1250, Teijin Chemical) was added so that the ratio of the titanyl phthalocyanine to polycarbonate resin is 30 to 100 (volume ratio) and the compound was dispersed by the ball mill for 24 hours. Into this dispersed solution, carrier a transporting substance as shown in Table 1 below of 75 weight percent to the polycarbonate resin was added and prepared to obtain monochlorobenzene/1, 2-dichloroethane=3/7 (volume ratio), which was coated on the above-described intermediate layer by spraying to form a photoreceptor of 20 μm in thickness and thus sample of the photoreceptor according to this invention was obtained.

EXAMPLE 14

An intermediate layer completely the same as the one of the embodiment 1 was formed on the polyester film laminated with aluminum foil.

Then 1, 2-dichloroethane solution containing 16.5 weight percent of the carrier transporting substance/polycarbonate resin (Panlite) L-1250, Teijin Chemical) at the ratio of 60/100 (weight ratio) as shown in Table 1 below was coated on the above-described intermediate layer by dipping, and dried to obtain a CTL of 15 μm in thickness.

Then as CGM, titanyl phthalocyanine according to this invention was ground with a ball mill for 24 hours, 1, 2-dichloroethane solution containing 6 weight percent of polycarbonate resin (Panlite) L-1250, Teijin Chemical) was added so that the ratio of the titanyl phthalocyanine to polycarbonate resin becomes 30 to 100 (weight ratio) and the compound was dispersed by the ball mill for 24 hours. This dispersed solution was added with carrier transporting substance as shown in Table 3 below in 75 weight percent to the polycarbonate resin. Monochlorobenzene was further added and prepared so that the ratio of monochlorobenzene to 1, 2-dichloroethane is 3 to 7 (volume ratio), which was coated on the above-described CTL by spraying to form CGL of 5 μm in thickness and thus the photoreceptor according to this invention was obtained.

Fourteen types of photoreceptors of Example 5-14 and Comparative Example 3-6 were mounted to a modified laser printer LP-3010 (Product of Konica Corporation), and differences between electric potential in unexposed part ($V_H$) and exposed part ($V_L$) at the initial stage and values after copying 10,000 times, $\Delta V_H$ and $\Delta V_L$ were measured respectively.

When assuming the exposure required to make the charging electric potential 600 V or −600 V to +300 V or −300 V to be $I_0$ (erg/cm$^2$), $$S\lambda = \frac{300}{I_0}$$

was assumed.

As the light source, a semiconductor laser (oscillating wavelength: 780 nm) was used.

Formula of each photoreceptor and the result of measurement are shown in the table below.

TABLE 3

|  | CGM | CTM | $V_H$ (V) | $V_H$ (V) | $S\lambda$ (V · cm/erg) | $\Delta V_H$ (V) | $\Delta V_L$ (V) |
| --- | --- | --- | --- | --- | --- | --- | --- |
| Example 5 | Synthesis Example 1 | I-1 | −600 | −15 | 180 | −5 | +5 |
| Example 6 | Synthesis Example 1 | I-2 | −590 | −10 | 195 | −10 | +5 |
| Example 7 | Synthesis | I-8 | −580 | −10 | 200 | −20 | +10 |

TABLE 3-continued

| | CGM | CTM | $V_H$ (V) | $V_H$ (V) | Sλ (V · cm/erg) | $\Delta V_H$ (V) | $\Delta V_L$ (V) |
|---|---|---|---|---|---|---|---|
| Example 8 | Synthesis Example 1 | I-35 | −570 | −10 | 205 | −15 | +5 |
| Example 9 | Synthesis Example 1 | I-39 | −580 | −10 | 200 | −15 | +5 |
| Example 10 | Synthesis Example 1 | I-44 | −620 | −20 | 170 | −5 | +10 |
| Example 11 | Synthesis Example 1 | I-48 | −600 | −10 | 190 | −10 | +5 |
| Example 12 | Synthesis Example 1 | I-70 | −610 | −10 | 180 | −10 | +10 |
| Comparative Example 3 | Synthesis Example 1 | Compound 1 | −500 | −30 | 160 | −50 | +100 |
| Comparative Example 4 | Synthesis Example 1 | Compound 2 | −530 | −60 | 130 | −40 | +80 |
| Comparative Example 5 | Synthesis Example 2 | I-1 | −520 | −80 | 60 | −50 | +25 |
| Comparative Example 6 | Synthesis Example 3 | I-1 | −530 | −110 | 50 | −60 | +15 |
| Example 13 | Synthesis Example 1 | I-2 | 580 | 30 | 130 | −30 | +15 |
| Example 14 | Synthesis Example 1 | I-8 | 630 | 40 | 120 | −20 | +25 |

The electrophotographic photoreceptor using a carrier generating substance and a carrier transporting substance according to this invention is high in long wavelength sensitivity, charging ability, and electric potential stability when used repetedly, providing clear images without fog.

On the other hand, for the comparison samples, sensitivity and charging ability decrease significantly, image density decreases and fogging is generated when used repeatedly. Examples suited to reversal development processes are explained below.

Photoreceptors of the Example 5 and 6 and Comprative Examples 3 and 4 as described above were mounted to a modified laser printer LP-3010 (Konishiroku Photo Industry), subjected to reversal development using two-component developer containing plus or minus toner respectively at plus or minus charge, image was formed repeatedly 1000 times, image density and amount of black spots on the white base were judged as ⊚ , ○ and x, the results of which are shown in Table 2. As a light source, a semiconductor laser (780 nm) and LED (680 nm) were used.

TABLE 4

| Photoreceptor | Light source | Image density | Amount of black spots on white base |
|---|---|---|---|
| Example 5 | Semiconductor laser | ⊚ | ⊚ |
| Example 6 | LED | ⊚ | ⊚ |
| Comparative Example 3 | Semiconductor laser | ○ | x |
| Comparative Example 5 | LED | ○ | x |

The amount of black spots was classified as follows:
⊚: 0 pc/cm²
○: Less than 3 pc/cm²
x: more than 3 pc/cm²

The image density was measured with Sakura Dencitometer, Model PDA-65.

⊚: Reflection density more than 1.0
○: Reflection density 0.6–1.0
x: Reflection density less than 0.6

It is known from above that the photoreceptor according to this invention is suitable to reversal development.

What is claimed is:

1. A photoreceptor for electrophotography comprising a titanyl phthalocyanine compound which has major peaks in terms of Bragg's 2θ angle to the CuKα characteristic X-ray wavelength at 1.541 Å at least at 9.5±0.2 degrees, 11.7±0.2 degrees, 15.0±0.2 degrees, 23.5±0.2 degrees, 24.1±0.2 degrees and 27.3±0.2 degrees.

2. The photoreceptor of claim 1, wherein said titanyl phthalocyanine has the following formula;

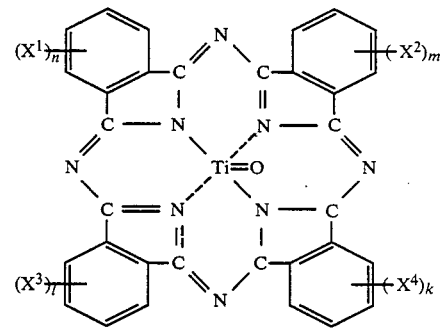

wherein, $X^1$, $X^2$, $X^3$ and $X^4$ independently is chlorine atom or bromine atom; and n, m, l and k are integers of 0 to 4.

3. A photoreceptor for electrophotography comprising an electroconductive support and, provided thereon, a photosensitive layer containing a titanyl phthalocyanine compound which has major peaks in terms of Bragg's 2θ angle to the CuKα characteristic X-ray wavelength at 1.541 Å at least at 9.5±0.2 degrees, 11.7 ±0.2 degrees, 15.0±0.2 degrees, 23.5±0.2 degrees, 24.1±0.2 degrees and 27.3±0.2 degrees as a carrier generating substance, and a compound having formula I as a carrier transporting substance;

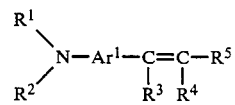

I (wherein, $R^1$ and $R^2$ independently is an alkyl group or an aryl group either of which may have a substituent; $R^3$ and $R^4$ independently is a hydrogen atom, a halogen atom, or an alkyl group, an aryl group, an alkoxy group or an amino group, provided that each group may have a substituent; $R^5$ is an aryl group or a heterocyclic group, either of which groups may have a substituent; and $Ar^1$ represents a substituted or unsubstituted aryl group.

4. The photoreceptor of claim 3, wherein the compound has the formula Ia;

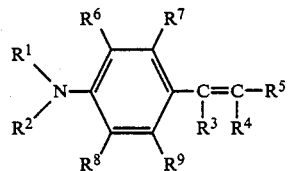

wherein, $R^1$, $R^2$, $R^3$, $R^4$ and $R^5$ independently is the same atom or group as defined in formula I; and $R^6$, $R^7$, $R^8$ and $R^9$ independently is a hydrogen atom, a halogen atom, a hydroxyl group, an alkyl group, an alkoxy group, an amino group or an aryl group, provided that these groups may have a substituent.

* * * * *

UNITED STATES PATENT AND TRADEMARK OFFICE
CERTIFICATE OF CORRECTION

PATENT NO. : 4,898,799
DATED : February 6, 1990
INVENTOR(S) : Fujimaki et al.

It is certified that error appears in the above-identified patent and that said Letters Patent is hereby corrected as shown below:

Abstract, line 5, change "9.4 ± 0.2" to --9.5 ± 0.2--.

Abstract, line 5, change first occurrence of "11.7 ± 0.2" to --9.7 ± 0.2--.

Signed and Sealed this

Eleventh Day of February, 1992

Attest:

HARRY F. MANBECK, JR.

Attesting Officer

Commissioner of Patents and Trademarks